Figure 1:
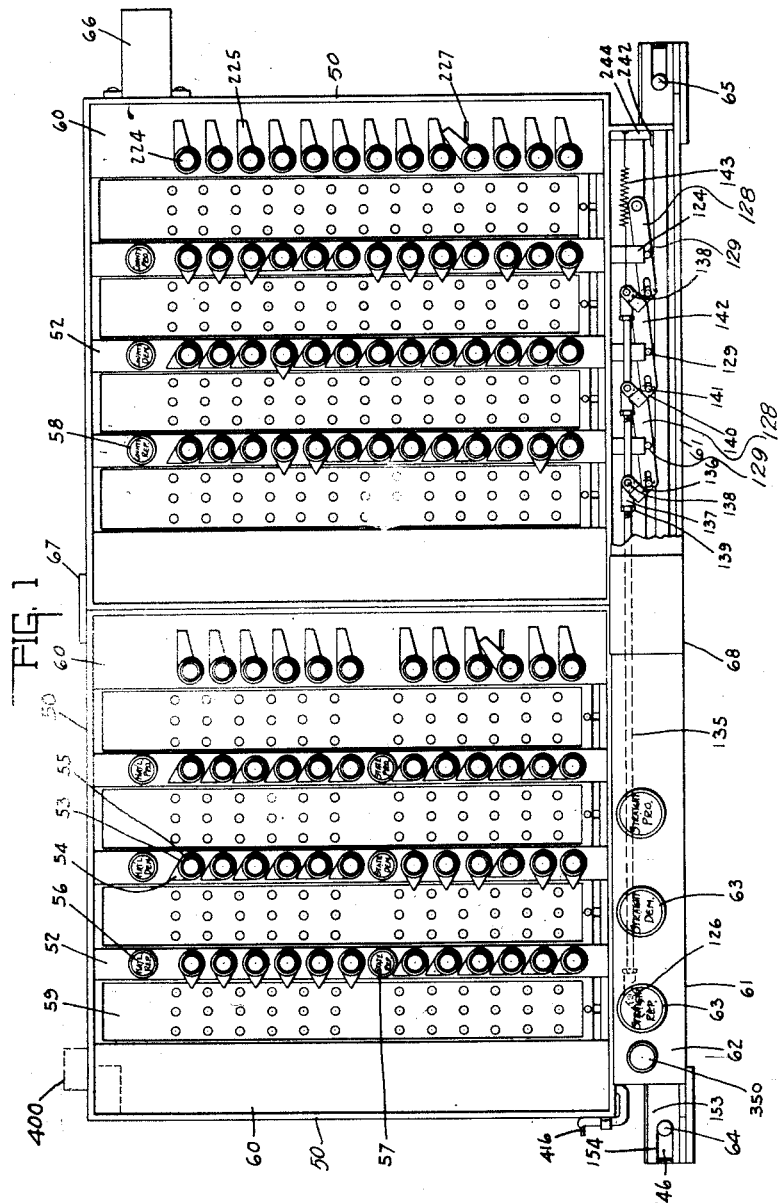

Jan. 11, 1927.　　　W. J. SCHUESSLER　　　1,614,320

VOTING MACHINE

Filed June 23, 1924　　　18 Sheets-Sheet 1

INVENTOR.
WILLIAM J. SCHUESSLER.

BY

ATTORNEYS.

Jan. 11, 1927. 1,614,320
W. J. SCHUESSLER
VOTING MACHINE
Filed June 23, 1924 18 Sheets-Sheet 2
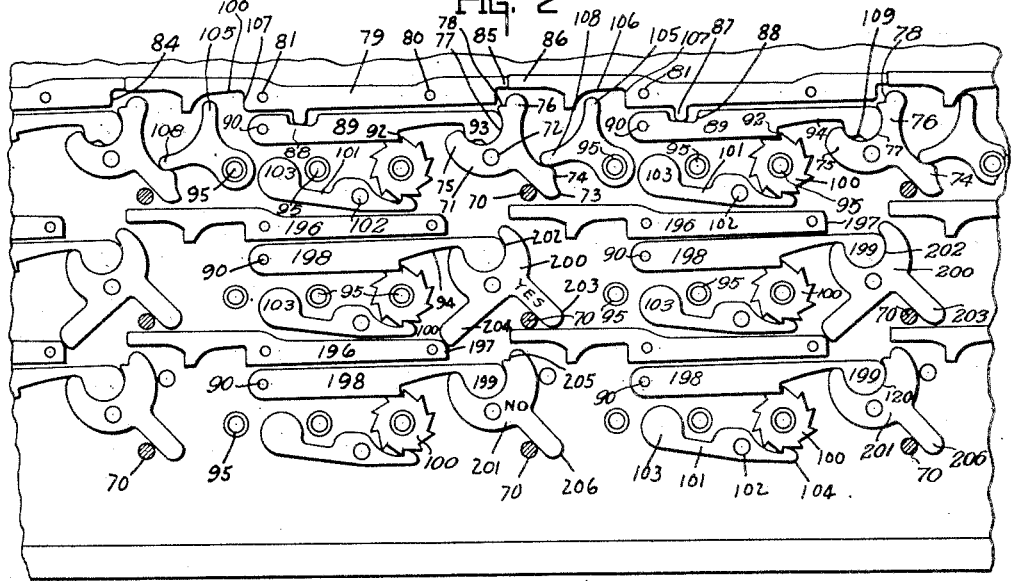
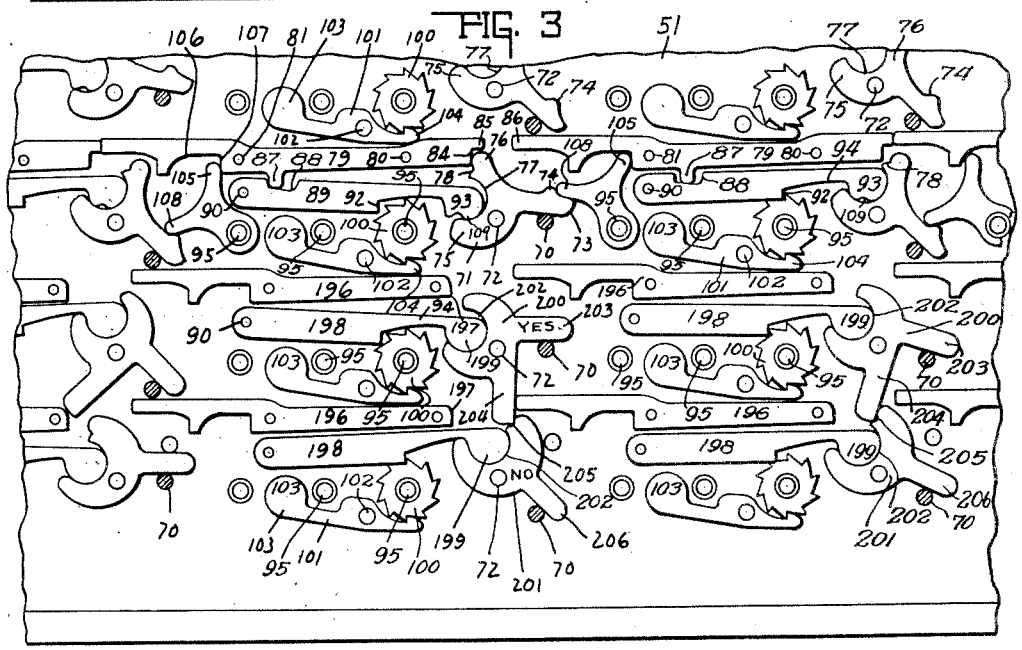
INVENTOR.
WILLIAM J. SCHUESSLER.
BY
ATTORNEYS.

Jan. 11, 1927.  W. J. SCHUESSLER  1,614,320
VOTING MACHINE
Filed June 23, 1924   18 Sheets-Sheet 3
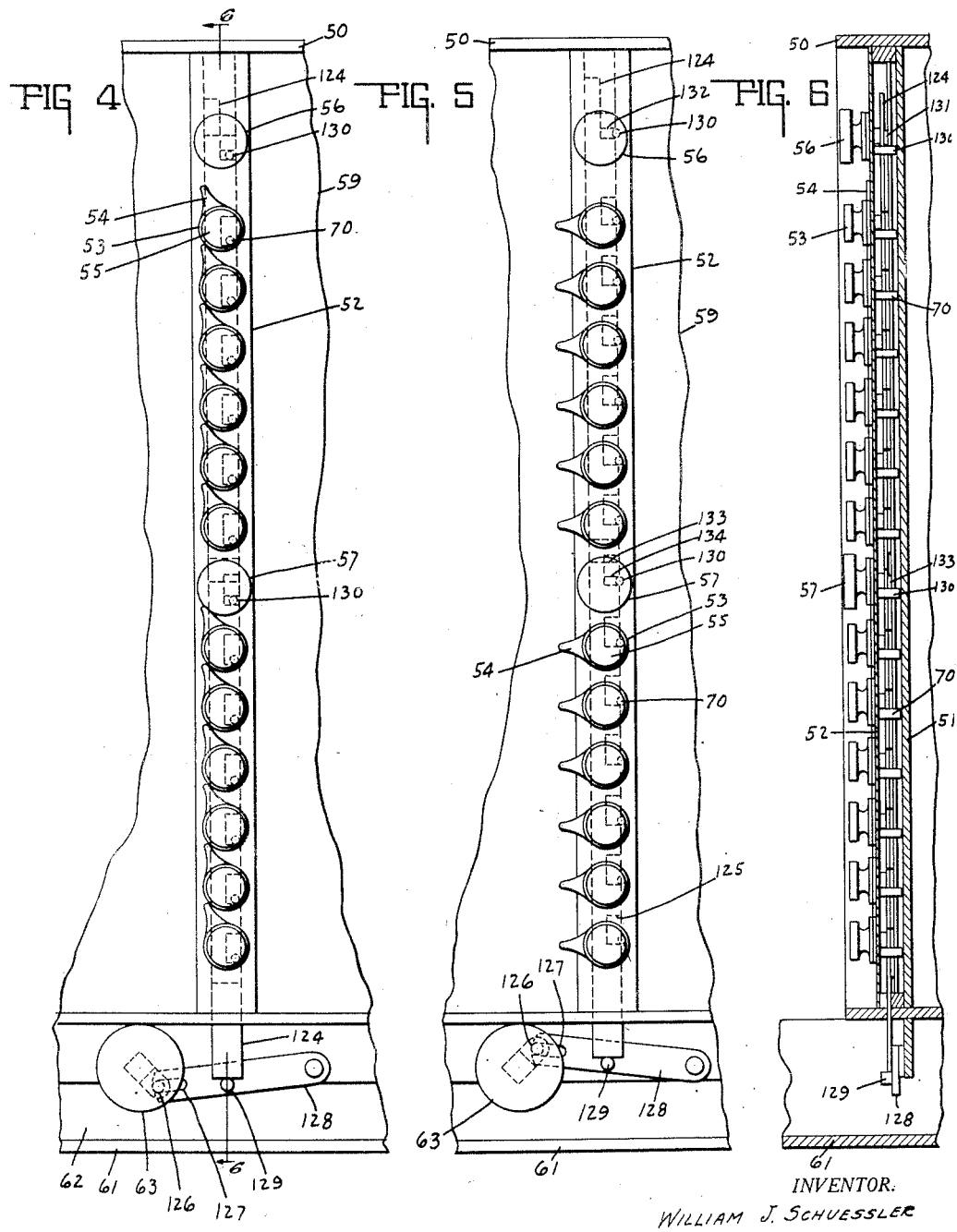
INVENTOR.
WILLIAM J. SCHUESSLER
BY
ATTORNEYS.

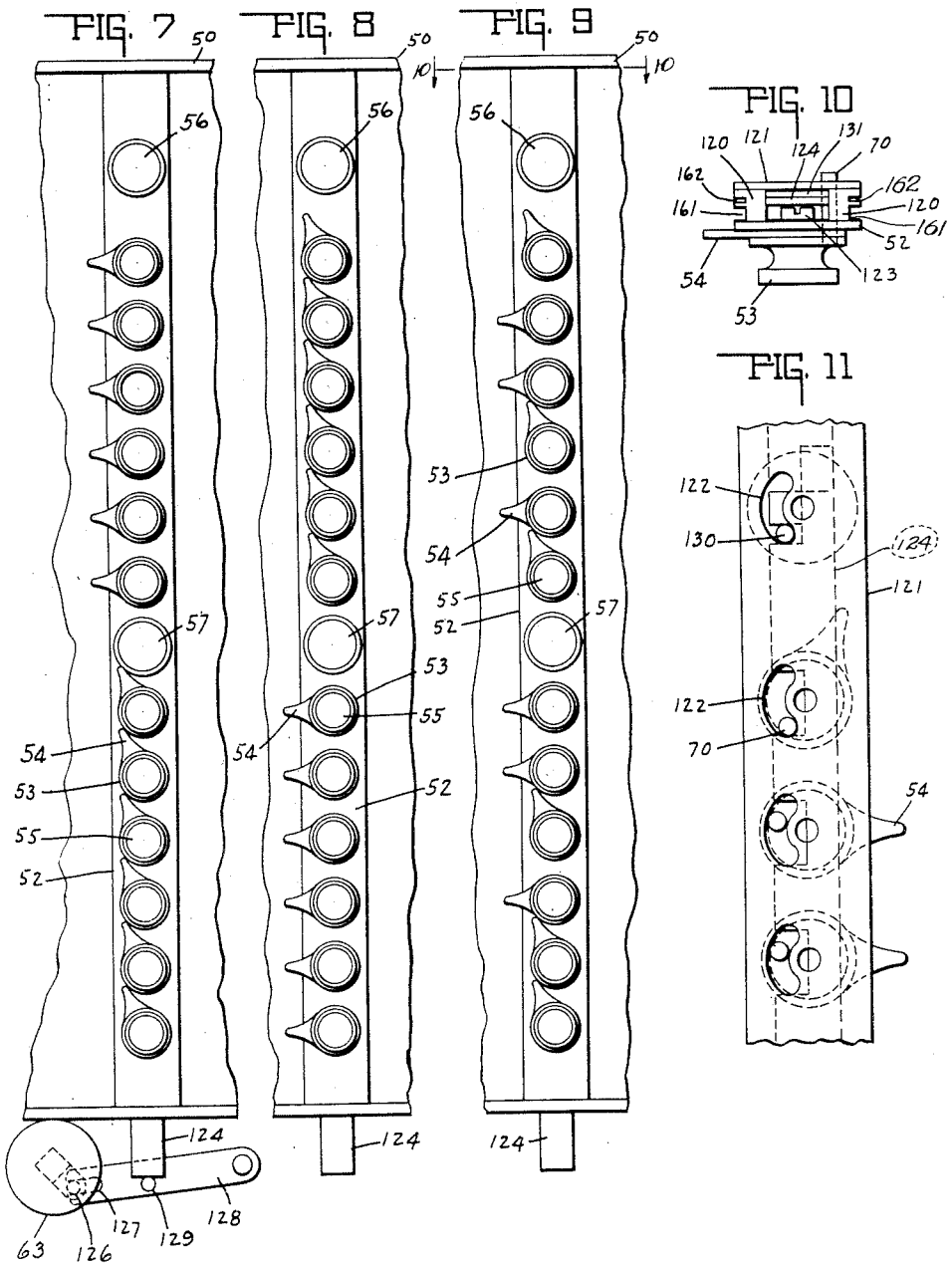

Jan. 11, 1927.  W. J. SCHUESSLER  1,614,320
VOTING MACHINE
Filed June 23, 1924  18 Sheets-Sheet 5
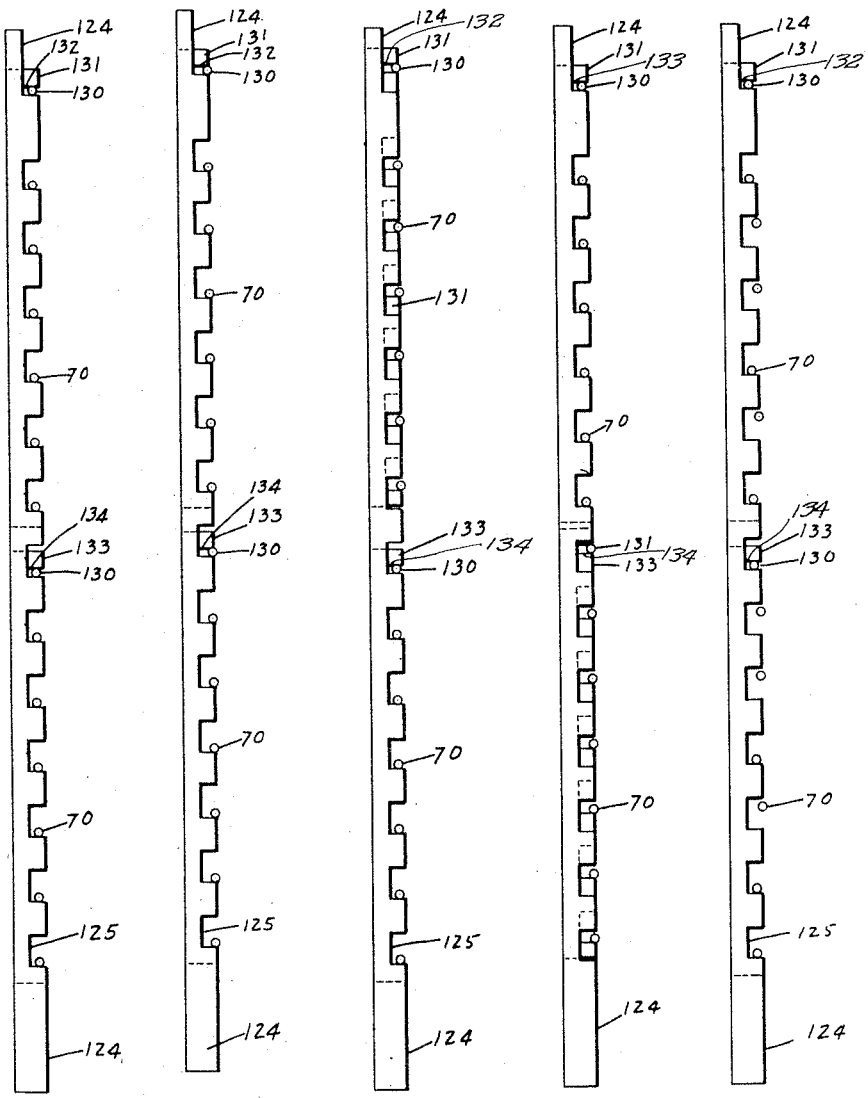
INVENTOR.
WILLIAM J. SCHUESSLER.
BY
ATTORNEYS.

Jan. 11, 1927.
W. J. SCHUESSLER
1,614,320
VOTING MACHINE
Filed June 23, 1924    18 Sheets-Sheet 6
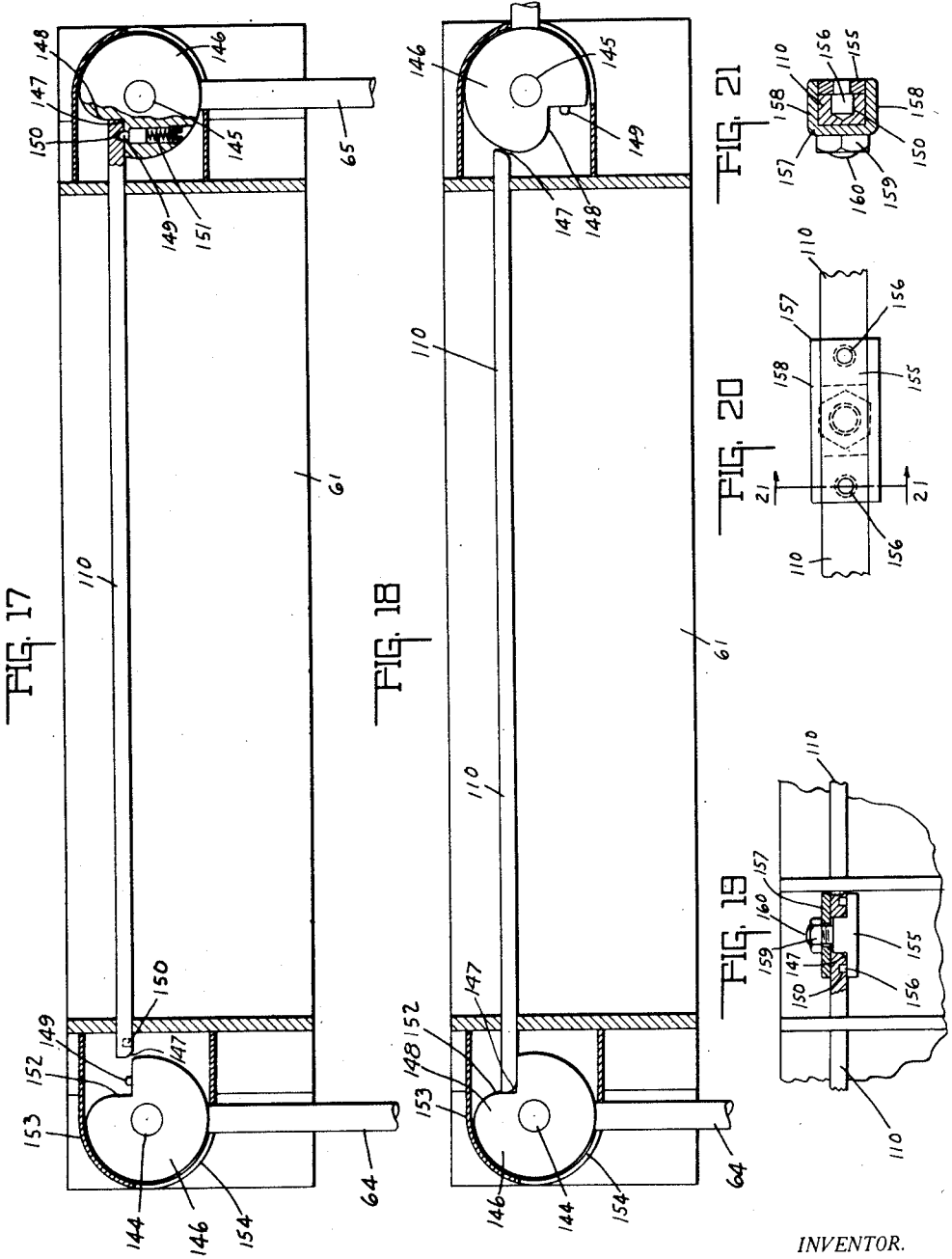
INVENTOR.
WILLIAM J. SCHUESSLER.
BY
ATTORNEYS.

Jan. 11, 1927.
W. J. SCHUESSLER
1,614,320
VOTING MACHINE
Filed June 23, 1924 18 Sheets-Sheet 7

INVENTOR.
WILLIAM J. SCHUESSLER.
BY
ATTORNEYS

Jan. 11, 1927. 1,614,320
W. J. SCHUESSLER
VOTING MACHINE
Filed June 23, 1924 18 Sheets-Sheet 8

INVENTOR.
WILLIAM J. SCHUESSLER.
BY
ATTORNEYS.

Jan. 11, 1927.                                   1,614,320
                W. J. SCHUESSLER
                 VOTING MACHINE
            Filed June 23, 1924    18 Sheets-Sheet 9
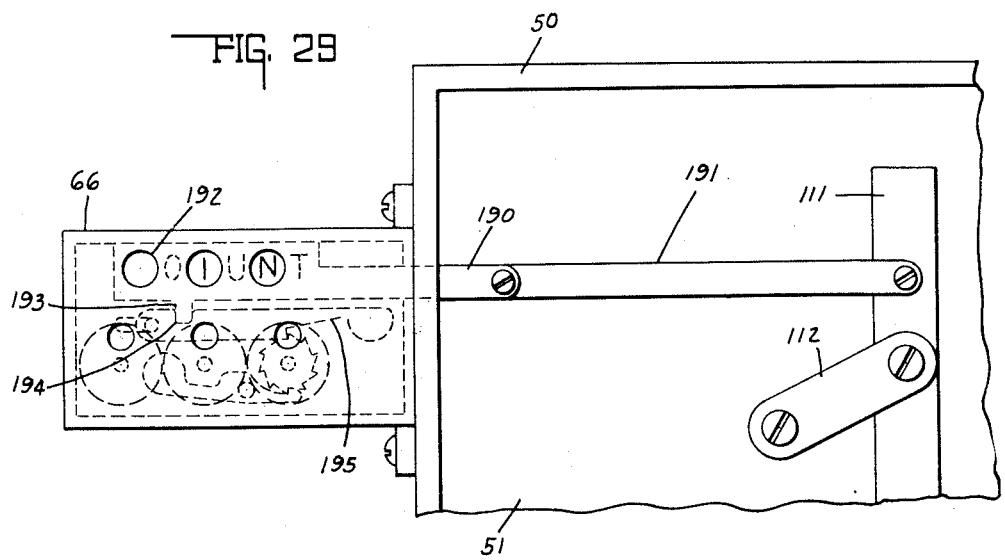
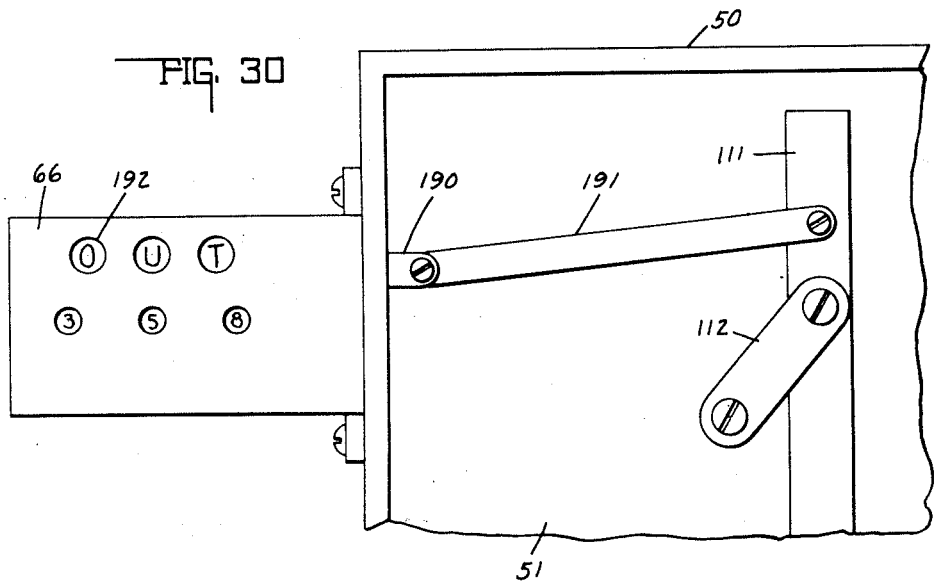
INVENTOR.
WILLIAM J. SCHUESSLER.
BY
       ATTORNEYS.

Jan. 11, 1927.

W. J. SCHUESSLER 1,614,320

VOTING MACHINE

Filed June 23, 1924      18 Sheets-Sheet 10

INVENTOR.
WILLIAM J. SCHUESSLER.
BY
ATTORNEYS.

Jan. 11, 1927.  W. J. SCHUESSLER  1,614,320
VOTING MACHINE
Filed June 23, 1924   18 Sheets-Sheet 11
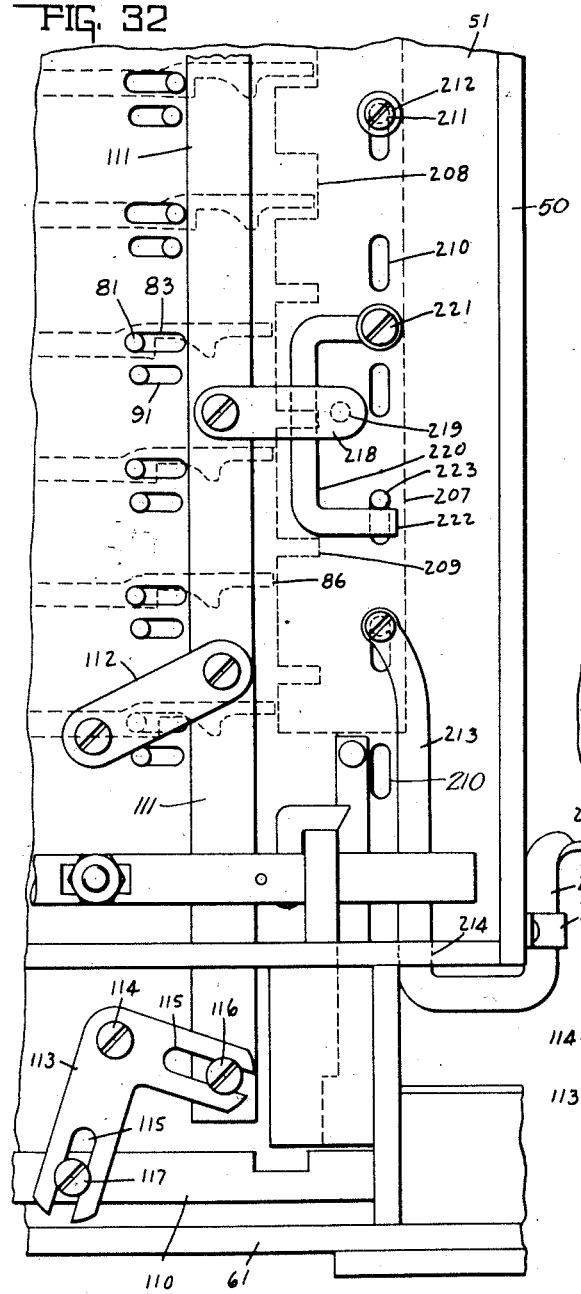
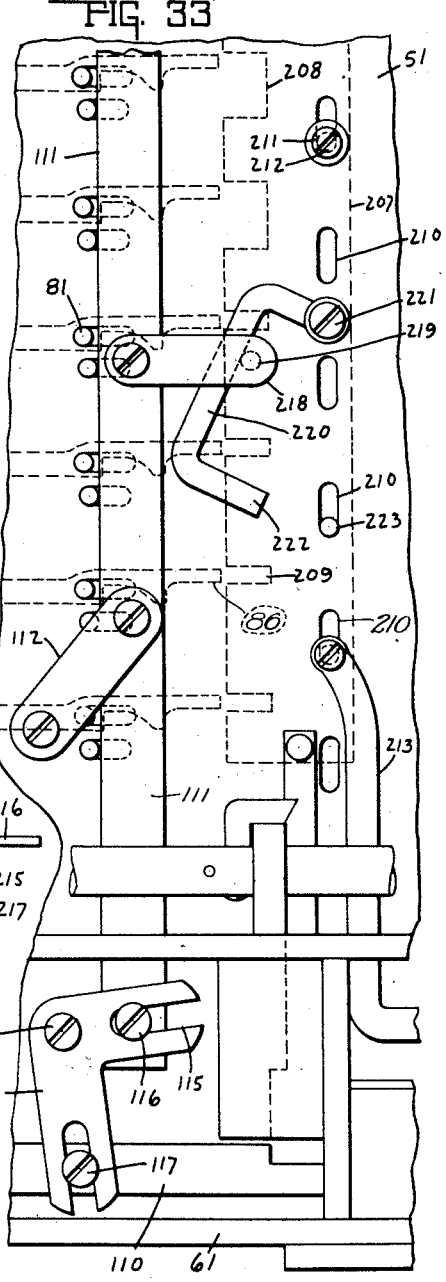
INVENTOR.
WILLIAM J. SCHUESSLER.
BY
Lockwood Lockwood
ATTORNEYS.

Jan. 11, 1927.

W. J. SCHUESSLER 1,614,320

VOTING MACHINE

Filed June 23, 1924    18 Sheets-Sheet 12

INVENTOR.
WILLIAM J. SCHUESSLER.

BY *[signature]*

ATTORNEYS

Jan. 11, 1927.
W. J. SCHUESSLER
1,614,320
VOTING MACHINE
Filed June 23, 1924  18 Sheets-Sheet 13
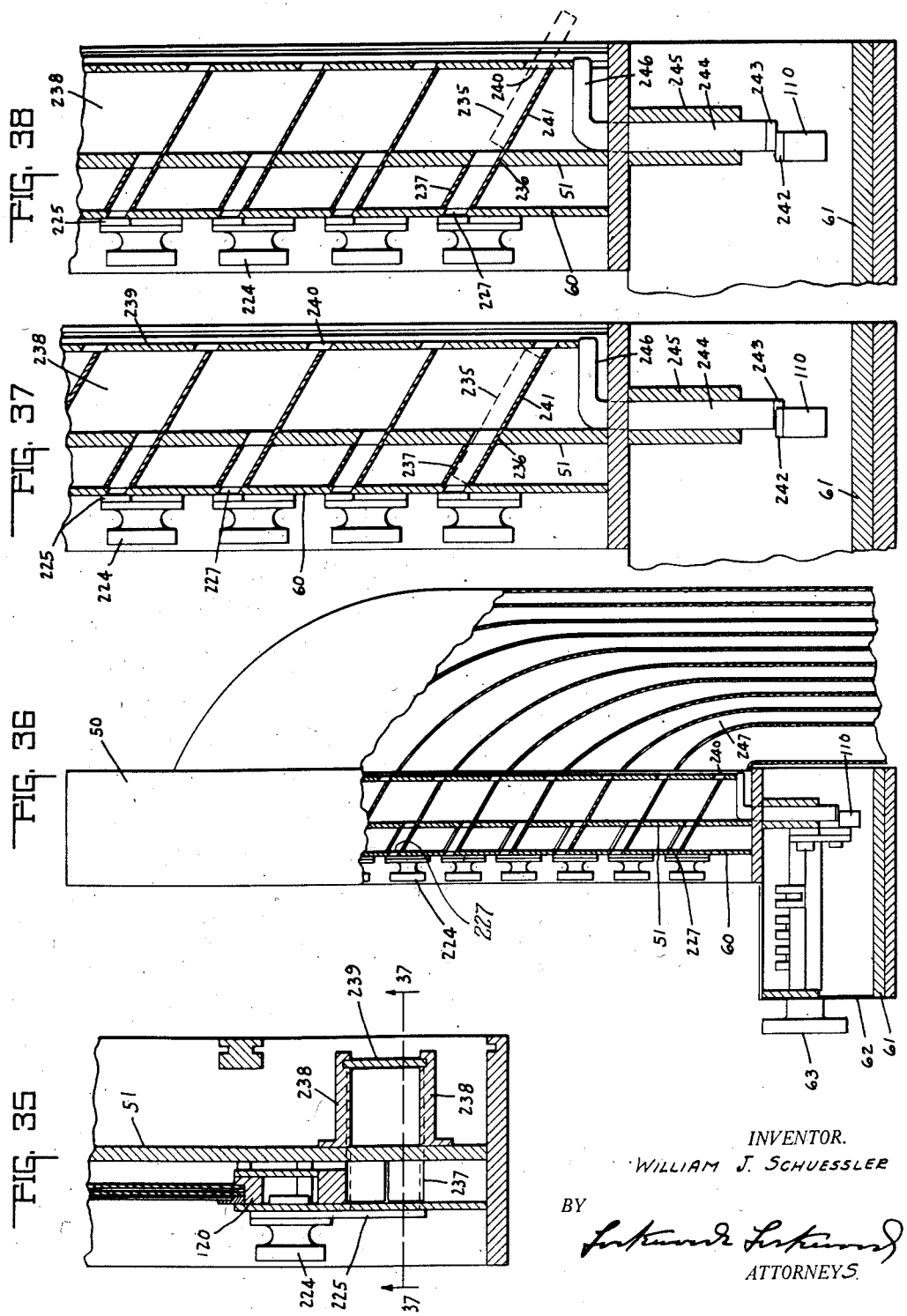
INVENTOR.
WILLIAM J. SCHUESSLER
BY
ATTORNEYS.

Jan. 11, 1927.

W. J. SCHUESSLER 1,614,320

VOTING MACHINE

Filed June 23, 1924   18 Sheets-Sheet 14

INVENTOR.
WILLIAM J. SCHUESSLER
BY
ATTORNEYS

Jan. 11, 1927.
W. J. SCHUESSLER
1,614,320
VOTING MACHINE
Filed June 23, 1924 18 Sheets-Sheet 15
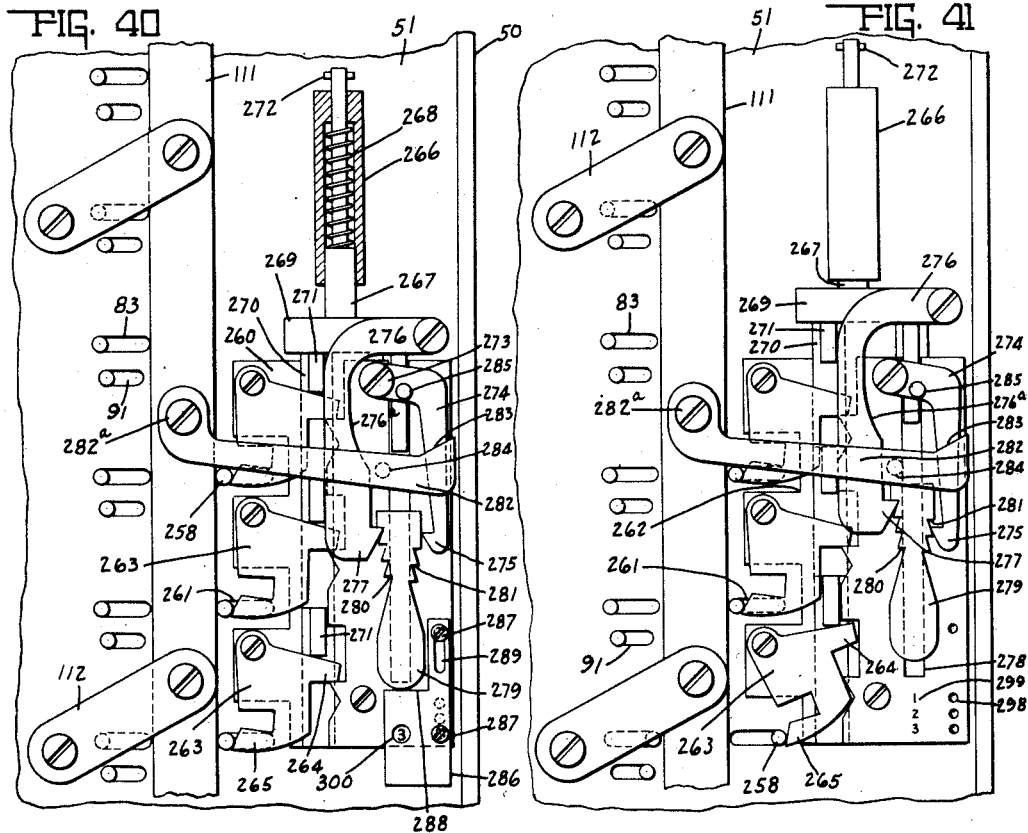
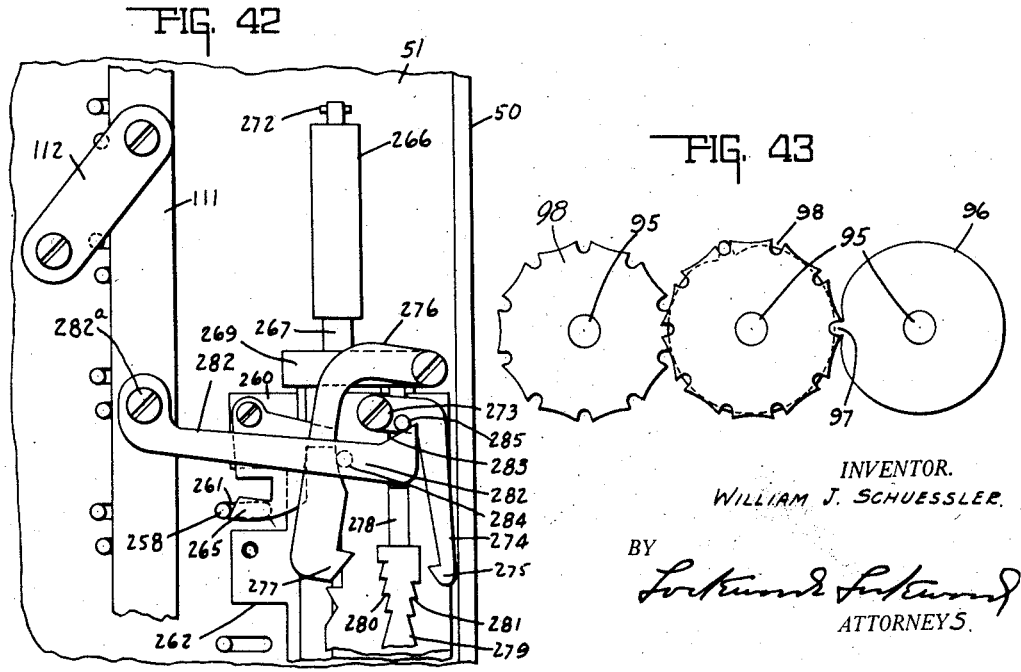
INVENTOR.
WILLIAM J. SCHUESSLER.
BY
ATTORNEYS.

Jan. 11, 1927.　　　W. J. SCHUESSLER　　　1,614,320
VOTING MACHINE
Filed June 23, 1924　　18 Sheets-Sheet 16
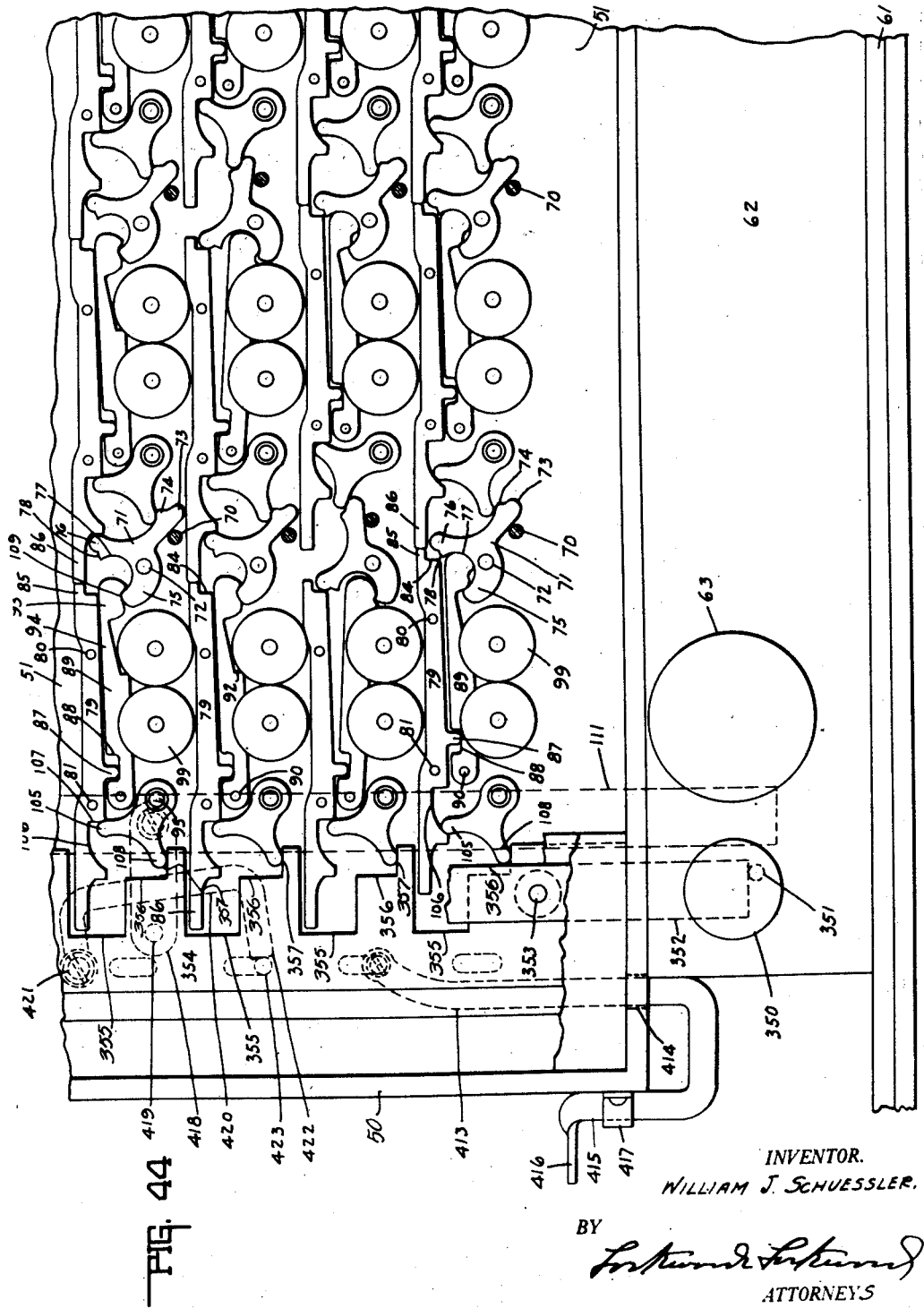
INVENTOR.
WILLIAM J. SCHUESSLER.
BY
ATTORNEYS Jan. 11, 1927.　　　　　　　　　　　　　　　　　　　　1,614,320
W. J. SCHUESSLER
VOTING MACHINE
Filed June 23, 1924　　　18 Sheets-Sheet 17
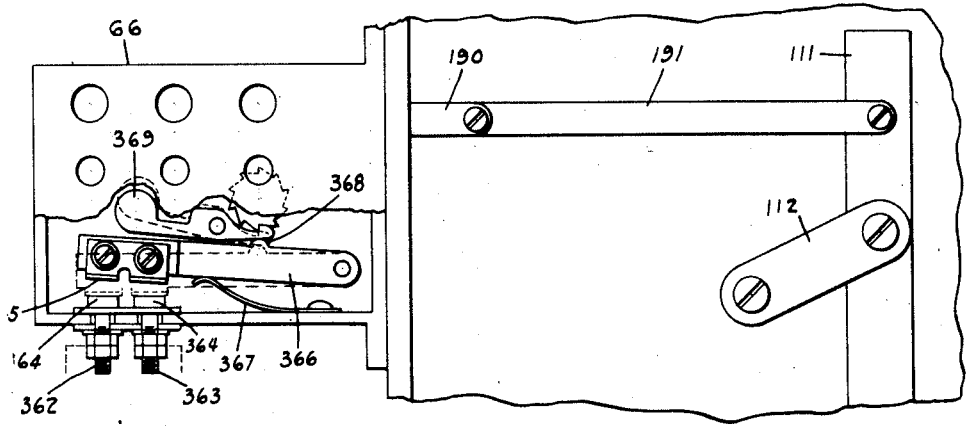
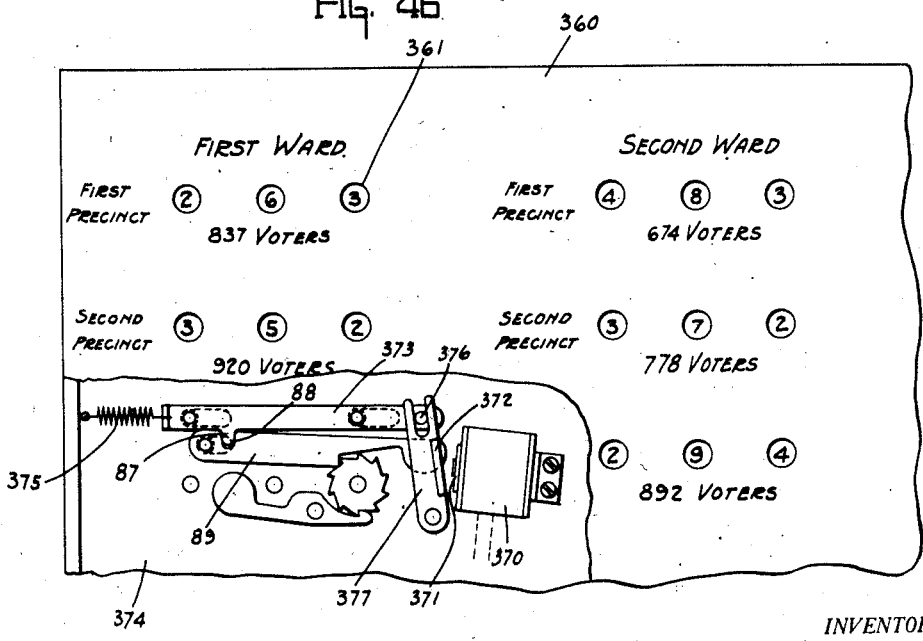
INVENTOR.
WILLIAM J. SCHUESSLER.
BY
ATTORNEYS.

Jan. 11, 1927.   W. J. SCHUESSLER   1,614,320
VOTING MACHINE
Filed June 23, 1924    18 Sheets-Sheet 18
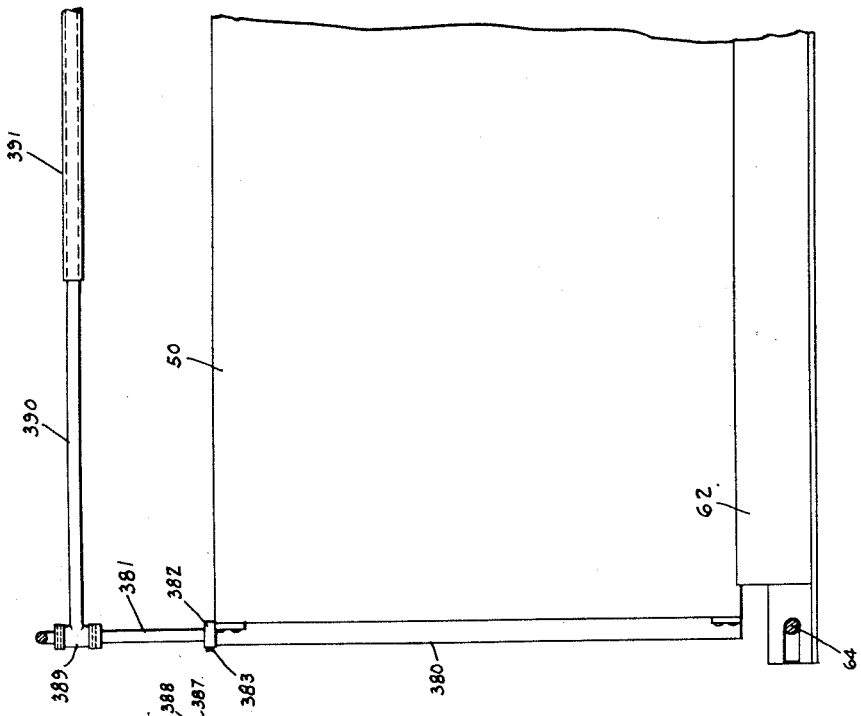
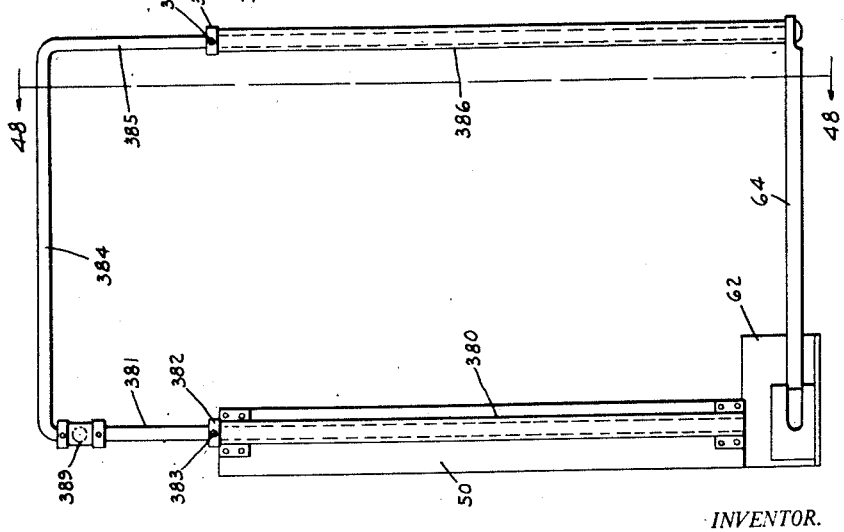
INVENTOR.
WILLIAM J. SCHUESSLER.
BY
ATTORNEYS Patented Jan. 11, 1927.

1,614,320

UNITED STATES PATENT OFFICE.

WILLIAM J. SCHUESSLER, OF KNOX, INDIANA, ASSIGNOR TO CUMMINGS VOTE REGISTER CORPORATION, OF KNOX, INDIANA, A CORPORATION.

VOTING MACHINE.

Application filed June 23, 1924. Serial No. 721,840.

The object of this invention is to simplify and improve, as well as extend the usefulness of voting machines.

This invention is an improvement upon voting machines such as illustrated in Patents No. 1,001,732, No. 1,010,596 and No. 1,216,778, dated August 29, 1911, December 5, 1911, and February 20, 1917, respectively.

The chief feature of this machine is that the same may be termed a "universal" voting machine, since the machine is adapted for all kinds of voting.

The machine is adapted to be constructed in detachable units such that but a portion of the machine may be used when desired.

Another feature of the invention consists, in addition to the straight party master control, of subsidiary and the individual scratching controls for each ticket, which permits a combination ticket to be voted by means of the subsidiary master controls, such as the national, state and county controls.

Another feature of the invention consists in simplifying the construction of the individual actuating and registering mechanisms associated with the registration of each vote for each particular office.

Still another feature of the invention consists in the interlocking arrangement for voting upon questions or bond issues and the like, wherein an affirmative vote will simultaneously lock the negative vote; and wherein a change from the affirmative vote to a negative vote after the affirmative vote has been actuated will automatically actuate the negative vote and return the affirmative vote to the non-registering position.

Another feature of the invention which is retained in this machine is the interlocking between the master controls whereby entrance into the voting booth, compartment or chamber containing the voting machine will operate suitable mechanism such that while a voter is in the compartment or chamber, no other voter can gain access thereto; and there is likewise retained in this machine the feature of the final registering of the entire vote by the voter leaving the compartment or chamber containing the voting machine, and in which registrations all the indicated mechanisms are returned to the normal or non-indicating position.

Other features of the invention which have been retained in the present machine consist in the interlocking construction wherein any of the master party controls, or of the subsidiary geographical controls, will return the indicating mechanisms to their original position and will move the desired indicating mechanisms to the indicating position.

Another feature of the invention consists in providing means for locking the machine at the expiration of the voting period, which mechanism is adapted to operate immediately upon the last voter leaving the machine or the enclosing compartment, or is adapted to operate immediately to lock the machine against continued voting if no voter is then in the compartment, or is voting upon the machine. If a voter is voting upon the machine, however, that vote will be recorded and the machine locked thereafter.

Another feature of the invention retained in this machine consists in supplying mechanisms for registering the total number of votes cast and other suitable mechanism for indicating whether a voter is in the booth or compartment and voting, or whether said booth or compartment is vacant.

Still a further feature retained in this invention is the provision for the casting of a restricted ballot by a restricted voter.

Another feature of the invention consists in a provision of means such that an entire party ticket can be written in, or any individual's name may be written in for any particular office, and other mechanisms associated with the foregoing registers the total number of written in votes, whereby a tally or check thereof may be had. In addition there is provided means for locking the writing in mechanism such that but one vote may be cast or written in for each office by the individual voter.

Still a further feature of the invention consists in associating means with the several indicating mechanisms whereby when a plurality of candidates are to be selected from a group for a plurality of like offices, said means will automatically record the number of persons selected for the like offices and prohibit the voting of more than the desired number of candidates, and yet said mechanism will also permit a voter to select any of the candidates for such offices independently of their position with respect to the other candidates for the same position, or their position on the party ticket.

Still a further feature retained in this invention is the perforated slide means associated with the indicating mechanisms for identifying the candidate and office associated with the indicating mechanism, and for covering the registering mechanisms during the voting interval so as not to disclose to the voters the number of votes previously cast for each candidate.

Another feature of the invention consists in providing means for returning all the indicating mechanisms to the normal or non-indicating position by a single means called an error key to permit the voter to change his selection.

A further feature of the invention consists in providing means for instantaneously registering the total vote cast in any voting division and for registering the totals at a central headquarters.

Another feature of the invention consists in associating with the voting means suitable curtains and curtain supports, the latter being adjustable to and with the machine.

Another feature of the invention is the provision of means whereby an election official at a primary election can lock the voting machine of the party for which the voter has not declared himself, thereby preventing the voting for candidates of the undeclared party.

Another feature of the invention consists in providing suitable signaling means operable by the primary restricting mechanisms to indicate the declared party.

A further feature of the invention is the provision of means for maintaining the signaling means and the primary restricting means in the aforesaid relationship until the voter has voted for the declared party and has left the voting compartment, whereupon the same are automatically returned to their original non-restricting and non-indicating positions.

The full nature of the invention will be understood from the accompanying drawings and the following description and claims.

Figure 22:
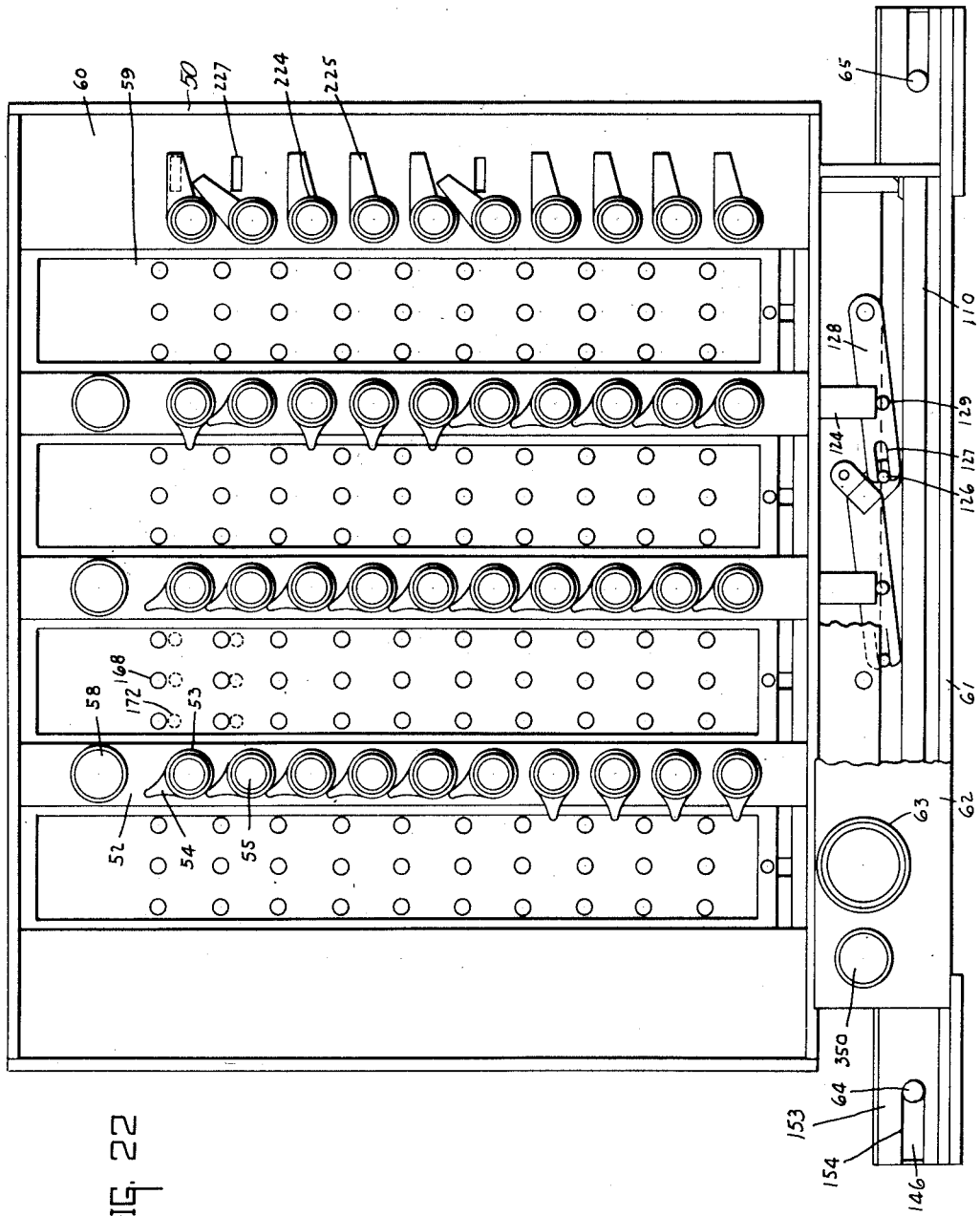
Figure 23:
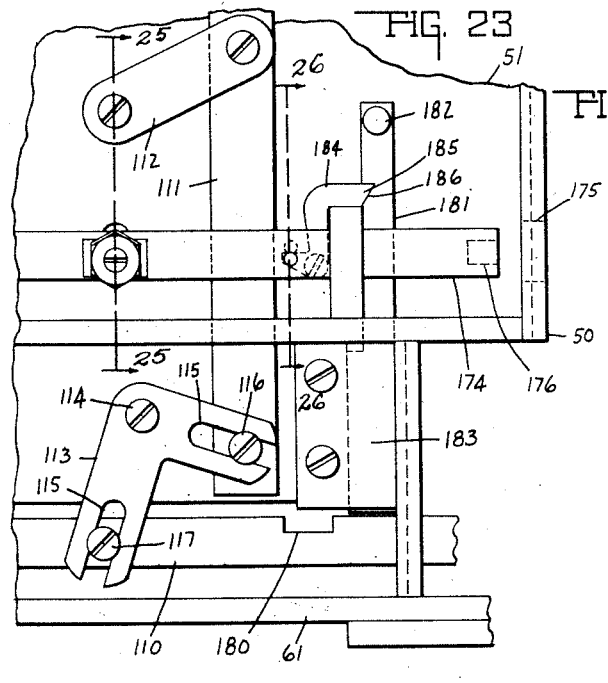
Figure 24:
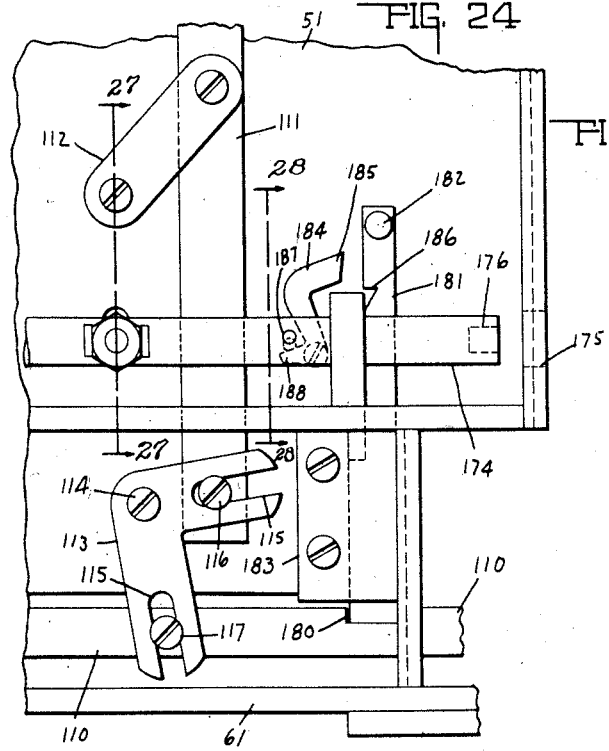
Figure 25:
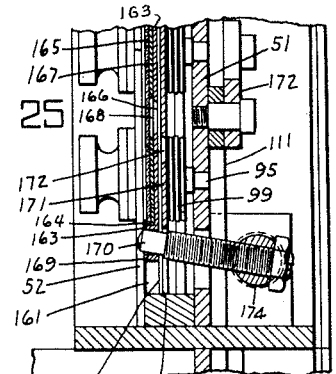
Figure 26:
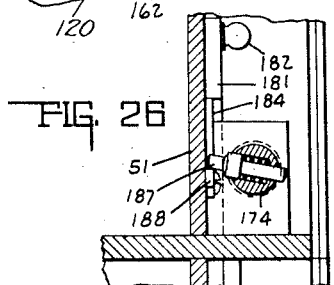
Figure 27:
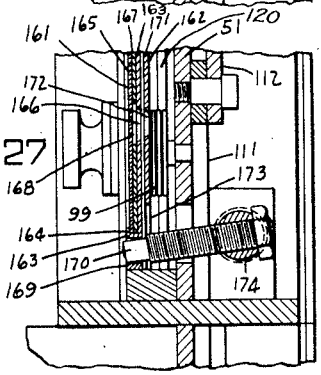
Figure 28:
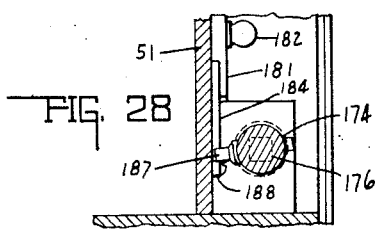
Figure 31:
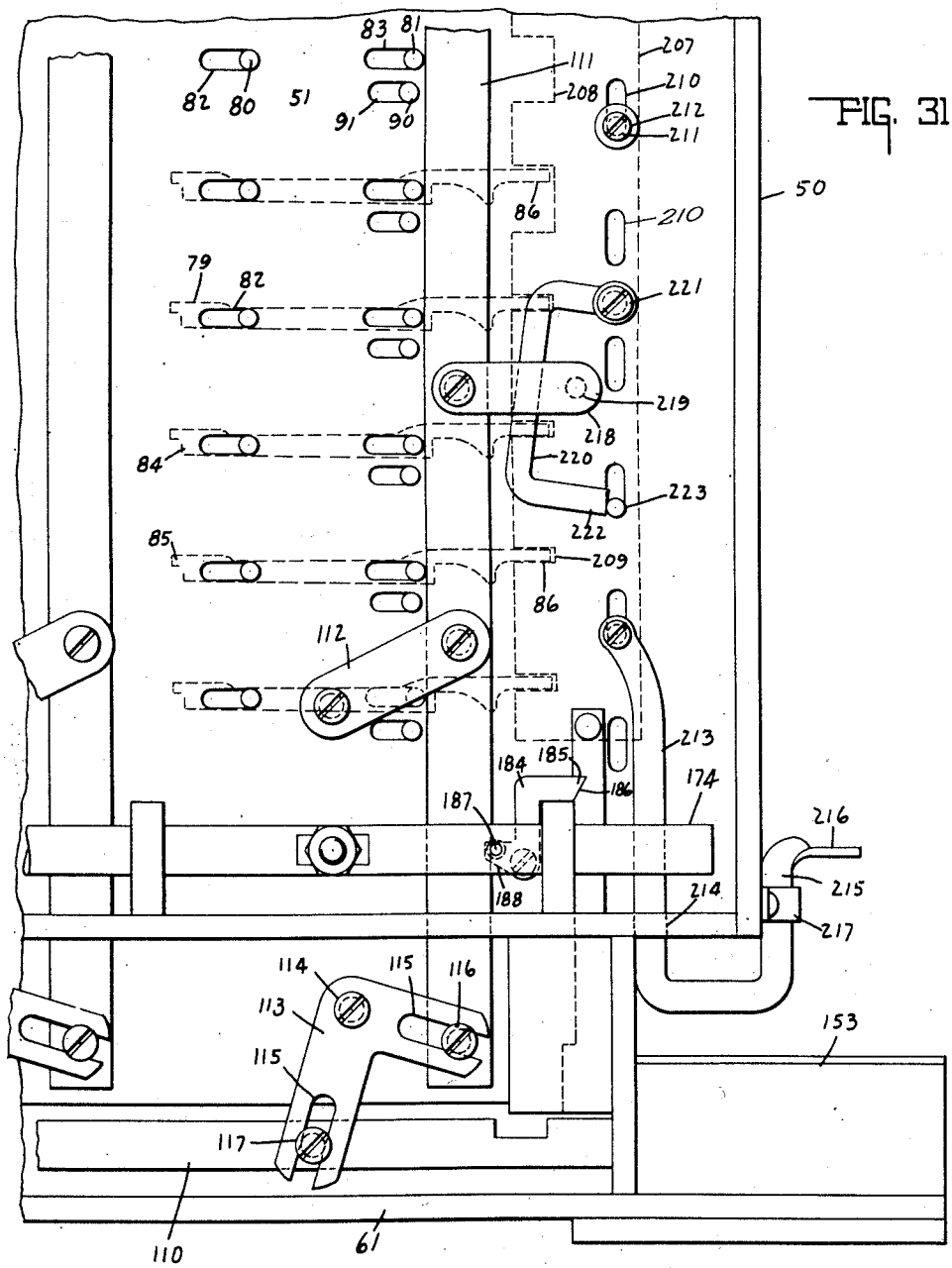
Figure 34:
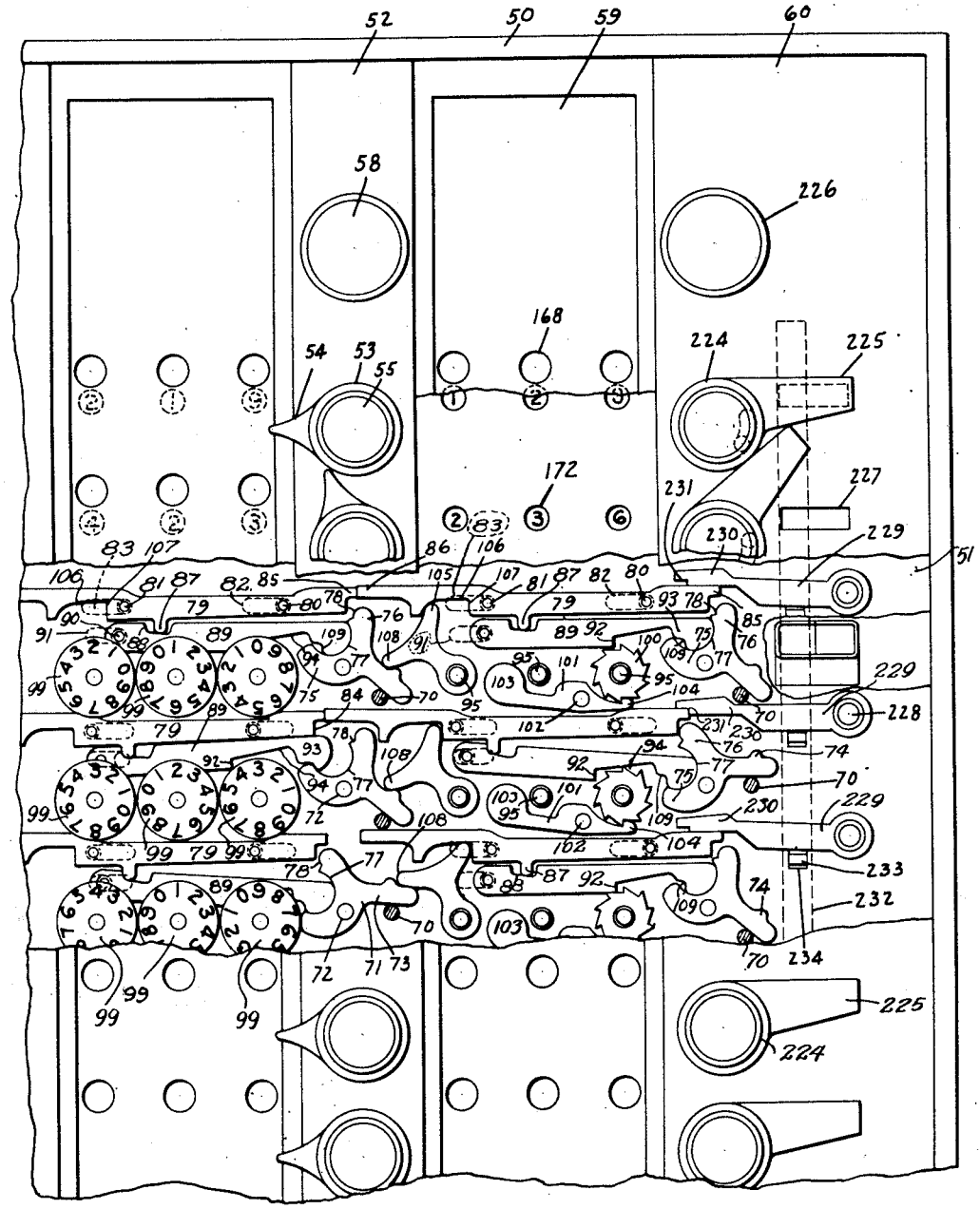
Figure 39:
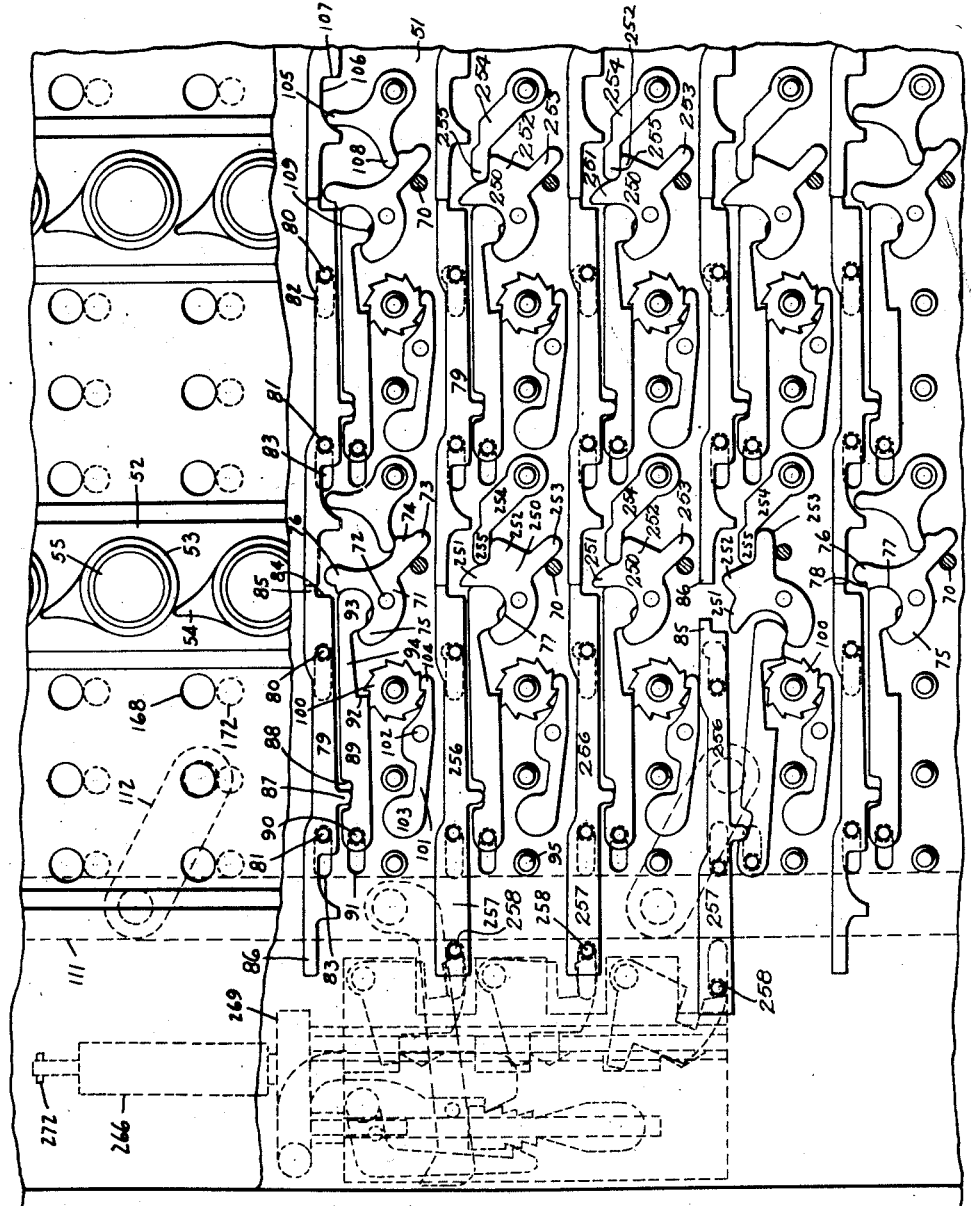

In the drawings, Fig. 1 is a front elevational view of the machine embodying the invention, said machine being illustrated as comprised of two panel sections, the base of one section being broken away to show other parts in detail. Fig. 2 is an enlarged front elevational view of a portion of the main supporting plate and the actuating mechanism supported thereby, said view illustrating the interlocking affirmative and negative vote and the interlocking vote, said parts being in the normal or non-indicating position. Fig. 3 is a similar view of the same parts showing the mechanism of the affirmative vote in the indicating position and locking the negative vote in the non-indicating position, as well as one of the office indicating mechanisms in the indicating position, and the other office indicating mechanisms for the same office locked in the non-indicating position. Fig. 4 is a front elevational view of the several indicating mechanisms controlled by a plurality of subsidiary master controls and a combined master control, the indicating mechanisms being illustrated in the non-indicating position. Fig. 5 is a similar view of the same parts shown in Fig. 4 and in the indicating position as when actuated by the combined master control. Fig. 6 is a longitudinal sectional view of the mechanism illustrated in Figs. 4 and 5 on line 6—6 of Fig. 4 and in the direction of the arrows. Figs. 7 and 8 are views similar to Figs. 4 and 5 and of the same parts. Fig. 7 shows several indicating mechanisms in the non-indicating position and other mechanisms in the indicating position, said last mentioned mechanisms being controlled by the auxiliary master control. Fig. 8 differs from Fig. 7 in that the indicating mechanisms in the non-indicating position in Fig. 7 have been moved to the indicating position in Fig. 8; while those in the indicating position in Fig. 7 have been moved to the non-indicating position in Fig. 8 by actuation of the respective controlling auxiliary master control. Fig. 9 illustrates the several indicating mechanisms when not actuated or controlled by either the master control or the auxiliary or subsidiary master controls, but wherein each of the indicating mechanisms in the indicating position has been individually moved thereto. Fig. 10 is a transverse sectional view taken on line 10—10 of Fig. 9 and in the direction of the arrows. Fig. 11 is an enlarged rear elevational view of the parts illustrated in Figs. 4 to 10 inclusive. Fig. 12 is a front elevational view of the rods controlling the indicating means and controlled by the various controls, said rods being in the normal or non-indicating position. Fig. 13 is a view similar to Fig. 12 and indicates the controlling rod associated with the combined or main master control for moving all of the indicating mechanisms independently of the auxiliary controls into the indicating positions. Fig. 14 is a view similar to Fig. 12 and indicates the position of the several rods when the indicating mechanisms are moved by the auxiliary master controls to the position illustrated in Fig. 7. Fig. 15 is a view similar to the preceding view and illustrates the rods in a position corresponding to the indicating mechanisms in Fig. 8. Fig. 16 is similar to the foregoing views and corresponds to the positions of the indicating mechanisms in Fig. 9. Fig. 17 is a top plan view of the interlocking main controls on the machine, parts being broken away and other parts being shown in section, said controls being in the vote receiving position, thereby permitting the voter to indicate his selection. Fig. 18 is a view similar to Fig. 17 and illustrates said interlocking controls in the registering position, wherein the machine permits the voter to emerge from the booth or compartment containing the machine and automatically registers the vote and clears the machine by returning the indicating mechanisms to the non-indicating position. Fig. 19 is a sectional view of the connection between the actuating bars of the means illustrated in Figs. 17 and 18 when said means are united in a multiple unit voting machine, as illustrated in Fig. 1. Fig. 20 is a bottom plan view of said connecting means. Fig. 21 is a cross sectional view taken on line 21—21 of Fig. 20 and in the direction of the arrows. Fig. 22 is a front elevational view of a single unit machine, parts near the base thereof being broken away to show other parts in detail. Fig. 23 is an enlarged rear elevational view of a portion of the machine, and in particular the locking means for locking the machine against further voting after the voting period has expired, said parts being shown in the unlocked or normal position, permitting the machine to receive a record votes. Fig. 24 is a similar view of the same parts but shows said parts in the locked position, thereby locking the machine such that the same is not adapted thereafter to receive or register further votes until such time as the mechanism is released from the position shown in Fig. 24 to the position shown in Fig. 23. Fig. 25 is a sectional view taken on line 25—25 of Fig. 23 and in the direction of the arrows. Fig. 26 is a sectional view taken on line 26—26 of Fig. 23 and in the direction of the arrows. Fig. 27 is a sectional view substantially similar to Fig. 25, but illustrates said parts in the locking position, and also illustrates the perforated candidate and office designating slide in the registering position to expose the vote cast for the several candidates, said section being taken on line 27—27 of Fig. 24. Fig. 28 is a sectional view similar to Fig. 26 and is taken on line 28—28 of Fig. 24. Fig. 29 is a rear elevational view of an attachment secured to the machine which automatically indicates the presence of a voter in the compartment and also indicates and registers the number of votes previously cast, the parts in Fig. 29 being in the position corresponding to that indicated by the position of the master controlling means illustrated in Fig. 17. Fig. 30 is a view similar to Fig. 29 and of the same parts and illustrates said parts in another position corresponding to that of the master controls indicated in Fig. 18. Fig. 31 is an enlarged rear elevational view of the means for restricting a restricted voter's ballot and illustrates said parts in the non-restricted position. Said figure further illustrates the transferring mechanism and locking means therefor associated with the indicating and registering mechanisms in the non-transferring position. Fig. 32 is a similar view of said parts and illustrates the same in the vote restricting position, and said restricting mechanism in the operative position. Fig. 33 is a similar view of said parts and illustrates the same in the transferring or vote-registering position and the releasing of the restricting mechanism to its original or normal non-restricting position. Fig. 34 is an enlarged front elevational view of a portion of the machine illustrating the means for writing in a party ticket or an individual's name for any particular offices or office, some of the parts being shown in the "writing in" position and others being shown in the non-indicating position, a portion of the device being broken away to show the mechanism for registering the written in votes and for automatically locking the other registering devices to prevent actuation thereof. One of said train of mechanisms illustrates the writing in mechanism in the indicating position and locking the other mechanisms, another of said normal indicating mechanisms locking said writing mechanisms in the non-indicating position and another train of mechanisms being illustrated in the non-indicating position. Fig. 35 is a transverse cross sectional view of the right hand end of the machine showing the mechanism associated with the "writing in" feature. Fig. 36 is an end elevational view of the several receiving compartments and slots associated with the writing in feature, parts being broken away to show other parts in section. Fig. 37 is a longitudinal sectional view taken on line 37—37 of Fig. 35 and in the direction of the arrows. This view illustrates the locking feature whereby but one vote can be written in for each office by the individual voter. Fig. 38 is a view similar to Fig. 37 and illustrates the locking mechanism in the vote-releasing position. Fig. 39 is a front elevational view, with parts broken away to illustrate the transferring and registering mechanisms associated with a plurality of candidates for a plurality of like offices, the selective mechanism for limiting the number of candidates selected for the like offices being shown in dotted lines. Fig. 40 is an enlarged rear elevational view of the selective registering mechanism shown in dotted lines in Fig. 39 and illustrates said mechanism in the initial or normal position. Fig. 41 is a similar view of said mechanism and illustrates the same in one of the operative registering positions. Fig. 42 illustrates said mechanism in the interlocking and releasing positions after the number or like offices to be filled has been voted upon. Fig. 43 is a front elevational view of a single registering train associated with one transferring mechanism. Fig. 44 is a front elevational view of the means for clearing the machine by a master error key. Fig. 45 is a view similar to Figs. 29 and 30 with parts broken away to illustrate an electric circuit switch attachment. Fig. 46 is an elevational view of a panel board provided with a plurality of counting or registering mechanisms, there being one mechanism for each voting machine, parts being broken away to illustrate in detail the operative means associated with each recording mechanism. Fig. 47 is a side elevational view of a curtain support associated with the machine. Fig. 48 is a front elevational view of said curtain support.

In the drawings there is illustrated a voting machine comprising a plurality of voting units or panels, and in this instance two units are shown. In the present invention, however, these units are not identical and the difference between the same will be pointed out hereinafter. The general arrangement of each of the units is substantially similar, and, therefore, a description of one will suffice for the other units. It will be understood that other units may be connected by means and in the manner hereinafter to be described when the number of tickets is increased beyond the three shown and when the number of offices is increased beyond the number shown upon the two units. It will, of course, be understood that while provision is made for but four party tickets, the mechanism of each unit may be extended or contracted to include more than four or less than four tickets as desired.

In the drawings 50 illustrates a rectangular framework forming the sides of a casing in which is stationarily secured a plate 51 not shown in Fig. 1 because covered but shown in Fig. 3. The plate 51 supports in the desired manner the several indicating, transferring, registering and several of the controlling devices. Each unit includes a plurality of vertical plate bars 52 upon which are suitably supported the indicating mechanisms and the auxiliary controls. The indicating mechanisms, see particularly Figs. 1, 4, 5, 7, 8 and 9, preferably consist of a circular button, key or knob 53 provided with an indicating portion, arm or finger 54. The button or key 53 is provided with suitable legend means, such as the disk 55 for designating the particular party ticket and the office. Thus 1—B would designate the first office and the second party ticket, and, therefore, represent the candidate of the second party for the first office. Similarly, the key labeled 3—C would indicate the candidate of the third party for the third office.

In Fig. 1 representing a political subdivision the left hand unit is provided with a master controlling wheel or knob 56 which is an auxiliary control and controls a plurality of indicating keys. This control is adapted to represent and actuate the national selection only. The left hand unit of Fig. 1 is also provided with a similar auxiliary knob or subsidiary master controlling wheel 57 which is arranged to control the state selections. It will also be noted that the right hand unit in Fig. 1 representing another political subdivision is provided with a subsidiary master controlling wheel or knob 58 which controls another sub-division of selections, such as the county. Thus, the machine is adapted to control selectively different groups. Suitable means hereinafter to be described and positioned between bars 52 is indicated generally by the numeral 59, and said means comprises the reference indications whereby the particular offices, the candidates therefor, and other information may be disclosed to the voter, as well as the vote cast for each candidate for each office to the election officials at the desired time. The units are also provided with suitable side plates 60 for closing the front of the machine and for supporting suitable indicating mechanisms if desired.

Each of the units see Figs. 1 and 6 is provided with a base portion 61 which is wider than the unit portion hereinbefore described and projects forwardly thereof. This base portion is provided with a front plate 62, see Fig. 1, upon which is pivotally supported a plurality of master ticket or party controlling wheels or knobs 63, each wheel or knob being associated with the respective party ticket and being adapted to control all of the individual indicating mechanisms independently of the auxiliary controlling wheels or knobs hereinbefore described. The means for connecting the master controlling knobs to the several individual indicating mechanisms associated therewith in other units without providing additional master controlling knobs will be hereinafter described in detail. Thus all of said individual indicating mechanisms associated with the same party ticket will be connected and operated by a single master controlling knob.

There is also provided see Figs. 1, 17 to 21 inclusive and Figs. 47 and 48 a pair of interlocking levers 64 and 65, 64 being termed the "entrance lever" and 65 the "departure lever". Both of these levers may be suitably connected to door mechanisms or other mechanisms, whereby said levers will control the operation of the machine in timed relation with the entrance and departure of the voter from the compartment, booth or chamber in which the voting machine is positioned. The means for interlocking said levers will be hereinafter described in greater detail. It will be understood, however, that this machine is substantially similar in its operation to the machines in the prior patents referred to. Therefore, the lever 64 when moved from the position shown in Fig. 1 to the left and right angles to said figure into a plane substantially parallel to that of the machine, will admit a voter into the voting booth or compartment and will simultaneously close the departure, entrance or door controlled by the lever 65. The connecting means between said levers or doors is so constructed that after the door controlled by the lever 65 is closed so that said lever returns to its initial position, as indicated in Fig. 1, the machine is cleared and is ready to receive the voter's selection. The voter thereupon actuates the respective master or auxiliary controls, or the individual indicating mechanisms as desired. After the voter has completed the selections desired, the door or other means controlled by the lever 65 is opened by said lever moving from the position shown in Fig. 1 to the position towards the right in said figure and into a plane parallel with the machine. This movement simultaneously locks the door entrance controlling closure means controlled by the lever 65 in the position shown in Fig. 1, and movement of said lever 65 into the open position permits the voter to emerge from the booth or compartment and automatically registers the vote and clears the machine by returning the indicating mechanisms to their non-indicating position, as well as actuates suitable indicating and registering mechanisms in the attachment 66 see Figs. 29 and 30. The attachment 66, as will hereinafter be described in detail, may be provided with suitable signalling means, either visible or audible, or both, as well as recording means for registering the total number of individual votes cast.

When a plurality of units or panels are used, the same are suitably connected together by means of a tie plate 67 see Fig. 1 securing together the top adjacent edges of the panels and the L-shaped base plate 68 for associating the bases of said panels together. The connecting means between the several mechanisms of the several panels has been indicated broadly hereinbefore and will be described in detail hereinafter.

Reference will now be had to Figs. 2, 3 and 34 wherein there is illustrated transferring, registering and interlocking mechanisms associated with the several indicating mechanisms for the same office. Fig. 2 illustrates said parts in the non-indicating position; while Fig. 3 illustrates some of the parts in the indicating position and other of said parts in the locked and non-indicating position. Each of the keys, wheels or knobs 53 is provided with an eccentrically mounted actuating pin 70. The pin 70 in Figs. 2 and 3 is shown in section and each is adapted to be associated with the depending tail of a pivotal cam arm 71 pivotally supported at 72 upon the plate 51. The pivotal supports 72 may be pin means secured to and upon said plate in any suitable manner. The depending tail 73 is provided with a projection 74. The pivotal arm 71 is provided with two separated projecting arms 75 and 76 respectively, 75 designating the lower arm and 76 the upper arm, said arms being separated by a curved or arcuate depression 77. The upper arm 76 is provided with a notch 78. Associated with the upper arm 76 and the notch 78 is a locking and carrier bar 79, see the same figures, said bar being provided with a plurality of pins 80 and 81, which pins are slidably supported in the elongated slots 82 and 83 respectively in plate 51, see Fig. 34. One end of the carrier bar 79 is cut away at 84 to form an abutment into which projects the upward portion of the arm 76 such that the lower edge of said abutment is engageable in the notch 78, as shown clearly in Fig. 3 when the carrier bar above the pivotal arm is actuated by said pivotal cam. The carrier bar, however, is adapted to be actuated by the adjacent carrier bar, in turn actuated by other carrier bars or by the pivotal arm beneath said second mentioned carrier bars. The end 85 is engageable by the end 86 of the adjacent carrier bar for slidable movement upon the plate 51 and controlled by the pins in said slots. Each carrier bar is provided with a depending tongue 87, which tongue rides in an elongated slot or groove 88 in a slidable recording bar 89. The bar 89 is provided at one end adjacent the tongue and groove connection 87 and 88 respectively with a pin 90 seatable in a slot 91 in the plate 51 and is slidable therein for guiding the recording bar 89. The recording bar 89 is provided with a tooth portion 92 and an arcuate cam portion 93, which arcuate cam portion is seatable in the arcuate or curved pocket 77 formed in the pivotal cam 71. Said tooth and said arcuate cam are separated by an elongated and cut away portion 94 such that the lowermost arm 75 is seatable therein, as illustrated in Figs. 2, 3 and 34.

Beneath each pair of bars 89 and 79 (see the same figures) are a plurality of, and preferably three pivots, 95 secured to and upon the plate 51. Upon each pivot there is mounted a register wheel 96 (see Figs. 34 and 43) which register wheel is provided with a carrying member or tooth 97 adapted to engage a slotted disk 98 upon the adjacent pivot. In turn said second mentioned wheel is adapted to engage another recording wheel and is provided with a similar carrying mechanism. Each of the wheels hereinbefore described is provided with a numeral carrying dial 99, which carries numerals from 0 to 9. Thus, the machine is adapted to register in the present instance 999 votes for each candidate for each office. In many jurisdictions voting precincts are limited to 1,000 voters, and, therefore, the machine is herein illustrated to accommodate the same number of voters. However, it will be readily understood that additional counting wheels may be provided for registering an unlimited number of votes for each candidate. The unit recording wheel 96 is provided with a ratchet wheel 100 having ten teeth (see Figs. 2, 3 and 34). The ratchet wheel 100 is engageable by the locking tooth 92, see Fig. 3, and is movable thereby to register one vote when the indicating mechanism associated with the indicating pin 70 is moved. In order to prevent unauthorized or unwarranted rotation of the ratchet wheel 100, and, therefore, the counting mechanism, a counterweighted latch 101 is provided. Said latch 101 is pivotally supported upon the plate 51 at 102 and provided at one end with a counterweight 103 and at the other with a locking tooth 104, which prevents reverse rotation of the ratchet wheel 100 and also frictionally engages said wheel such that the wheel will not freely rotate on its spindle or pivot 95.

One of the pins 95, and preferably the pin beneath the superposed slots 83 and 91, supports, in addition to the counting wheel 99, a lock in the form of a cam pivotally supported at its base. The upper arm 105 of the Y or T-shaped cam is seatable in a slot or groove 106 formed in the transfer or carrier bar 79. The groove 106 provides a cam surface 107 which is engageable by the upper arm of the Y-shaped cam. Thus, pivotal movement of the cam 71 is transmitted through the upper arm 76 thereof to the carrier bar 79, and the carrier bar 79 through the abutment 107 engages the upper arm of the T or Y-shaped cam, and, therefore, tilts said locking cam 105 upon its pivot such that the lower arm 108 thereof is adapted to engage the upper side of the projection 74 upon the adjacent pivotal cam 71 and lock said pivotal cam in the non-indicating position. This movement maintains the actuating bar 89 in position such that reciprocatory movement thereof will not cause the tooth 92 to engage a tooth on the ratchet wheel 100 and register said vote. Therefore, each carrier bar is adapted to actuate the adjacent pivotal lock 105 to lock the adjacent registering mechanism and actuating means against actuation and registration.

The reciprocation of the non-indicating bars 89 such that the same does not actuate the ratchet wheel 100 associated with each bar is secured by means of the groove 109 formed in the arcuate cam portion 93. Said groove surface is ridable and seatable upon the lower arm portion 75 of the pivotal arm 71, therefore, in the reciprocation of the actuating bar 89, said lower arm 75 causes the arm 89 to be elevated out of engagement with the ratchet wheel in its reciprocation. It will, of course, be understood that the tilting of the pivotal arm 71 or cam lowers the lower arm 75 such that the tooth 92 of the of the actuating bar 89 will engage a tooth on the ratchet wheel 100 and rotate said ratchet wheel through the angular distance of one tooth or one-tenth of a revolution.

Reference will now be had to Figs. 31, 32 and 33 and Figs. 17 and 18 respectively. The levers 64 and 65 are suitably connected to a main actuating bar 110, which bar is reciprocable longitudinally of the voting machine by means of said levers. Adjacent each series of projecting pins 81 and 90, slidably supported in the slots 83 and 91 respectively (see Fig. 34), there is positioned a vertical bar 111, which bar is pivotally supported upon the back of the plate 51 by suitable link means 112 (see also Figs. 23 and 24). The lower end of the bar 111 terminates adjacent the transverse actuating bar 110 (see Fig. 32) and pivotally supported upon the plate 51 at 114 adjacent said end and the bar 110 is a bell crank lever 113. Each end of said bell crank is suitably slotted as at 115, and said ends are adapted to engage pins 116 and 117 respectively upon the bars 111 and 110 such that reciprocatory movement of the bar 110, when actuated by the departure closure controlling lever 65, will elevate said bars 111 and move the same sidewardly upon said plate (see Figs. 31, 32 and 33) and into engagement with the pins 81 and then the pins 90 in succession and move both of said pins with the bars 79 and 89, respectively, to the non-indicating or original and normal position (see Fig. 33). The sideward movement of the bar 111 is secured by the parallelogram construction including plate 51, bar 111, and connecting links 112. It will be apparent that movement of the lever 64 (see Figs. 17 and 18) will have no control over the reciprocation of the pins 81 and 90, these being individually or groupingly-actuated, but the bar 111 will be actuated by the lever 65 or means associated with said lever to return the transferring and recording mechanisms to their proper positions by the movement, thereby clearing the machine for the next succeeding voter.

The means for controlling the indicating mechanism or simultaneously moving the individual knobs 53 by means of the master wheel or knob 63 or any one of the auxiliary master wheels 56 will now be described in detail, reference being had to Figs. 4 to 16 inclusive. In Fig. 10 an individual indicating mechanism is shown and it will be noted that upon the plate bar 52 is pivotally supported the button or knob 53 having the indicating finger or arm 54. Each button or knob eccentrically supports an actuating pin 70, which pin is associated with the actuating or tilting cam 71 hereinbefore described with reference to the transferring and recording mechanisms, as well as the interlocking mechanisms. Positioned to the rear of the plate 52 is a pair of separated guide bars 120, which guide bars are connected together by a back plate 121 provided with suitable arcuate slots 122 therein see Fig. 11 through which extends and is slidable or movable the projecting end of the pin 70. The pivotal mounting of the knob 53 is secured by suitable means, such as the screw 123, extending through plate 52 and positionable, in the elongated channel or passage formed by the front and back plates 52 and 121 respectively. The side channels or bars 120 slidably support one or more master controlling bars 124. Each master controlling knob is provided with a bar. These bars are illustrated in elevation in Figs. 12 to 16 inclusive. Each of said bars is suitably notched, as at 125, to receive the pin 70. It will be readily understood from the drawings particularly Figs. 4 to 7 that the bar 124 is suitably actuated by the master knob 63. In Fig. 4 it will be noted that the knob 63 is provided with a pin 126 seatable in a slot 127 in a pivoted link or lever 128. The lever 128 carries an elevating pin 129 upon which the lower end of the rack bar 124 rests. Therefore, when the knob 63 is turned counterclockwise, as indicated in Fig. 5, said pin 129 elevates the rack bar 124 and each of the notches 125 engages one of the pins 70 adjacent thereto and actuates the same, which not only moves the indicating mechanism to indicate that the particular individual knob 53 has been actuated, but also moves the transferring mechanism hereinbefore described to the registrable position. The main or party master rack bar has been designated by the numeral 124, and as shown clearly in Figs. 4 to 6, each of the auxiliary master knobs 56 and 57 is provided with a pin 130. Said pin 130 is actuated in substantially the same manner as the pin 70 by means of the rack bar 124. Thus, when the master controlling knob 63 is actuated, the auxiliary controlling knobs will also be actuated.

When it is desired to vote a straight ticket, as hereinbefore described by means of the master knob 63, with the exception of a geographical division such as the state ticket wherein it is desired to vote a straight ticket of a different party for said geographical division, auxiliary rack bars are provided, each of which is associated with the auxiliary master controlling knobs 56, 57 or 58 as desired. Herein there is associated with the auxiliary knob 56 a rack bar 131 see Figs. 6 and 12 to 16 provided with a slot 132 for engagement with the pin 130. Said rack bar is also suitably notched so as to engage the pins 70 in substantially the same manner as the rack bar 124. In Figs. 4 to 6, and 12 to 16, it will be seen that the other master knob 57 is also provided with a rack bar 133 provided with a notch 134 for receiving the pin 130 carried by the said master knob. It will be remembered that when the indicating mechanism, or when selected the pin 70 associated therewith is moved, it locks the other pins for the same office. Similarly, when the change is made from one selection to the other for the same office, such change automatically returns the mechanisms and the pins 70 for the same office to their original positions and positions the new choice in the indicating position. Thus, actuation of the main master control 63 will move all of that party's indicating mechanisms to the indicating position. Subsequent operation of a different party's subsidiary auxiliary controlling knob, such as hereinbefore described as the wheels 56 and 57, will move the individual knobs controlled thereby to the indicated position and return those knobs moved to the indicated position by the master controlling knob to the non-indicating position.

When a plural panel machine, or a plural unit machine is used see Fig. 1, the pin 126 is extended and the same is connected to an extension rod or rod means 135 see Fig. 1. Said rod is associated with a rock shaft 135 see right hand of Fig. 1, which rock shaft carries the arm 137 by which the link 138 is pivotally associated with said rock shaft and adjustably associated by means of the nut 139 with the rod 135, whereby rocking movement of the pin 126 will be transmitted to the rock shaft 136. The rock shaft 136 carries a depending arm 140, and said arm supports a pin 141 which engages a link or lever 142 substantially similar in its construction to the slotted link 128. Said links or levers 128 or 142 carry the pin 129 for elevating the master rack bars 124. Associated with each of the reciprocating rods 135 is a suitable spring 143 having one end connected to the frame and the other end connected to said rod for returning the same to the non-indicating and initial position.

Fig. 4 illustrates all the indicating mechanisms in the non-indicating position, while Fig. 5 illustrates all the indicating mechanisms where moved to the indicating position by means of the master wheel or knob 63. Fig. 7 illustrates an auxiliary group of indicating mechanisms moved to the indicating position by means of the subsidiary master knob 56. Fig. 8 illustrates another group similarly actuated. Figs. 7 and 8 when combined readily illustrate a ballot divided geographically and scratched, wherein one geographical division is voted on one ticket and another ticket is voted for a subsidiary geographical division. Fig. 9 illustrates the foregoing indicated mechanisms when individually scratched. Figs. 12, 13, 14, 15 and 16 illustrate the respective positions assumed by the rack bars 124, 131 and 133 and correspond to the positions of the indicating mechanisms, as illustrated in Figs. 4, 5, 7, 8 and 9 respectively.

The means for interlocking the levers 64 and 65 is illustrated in Figs. 17 and 18. Each of the levers 64 and 65 is pivotally supported at 144 and 145 respectively. Each of said levers terminates in a cam portion 146, the center of which is the pivotal support hereinbefore noted. Each end of the rod or bar 110 is preferably rounded or tapered, as at 147, such that the same will be moved from the position shown in Fig. 17 to the position shown in Fig. 18 by the camming projection 148 of the cam 146. In said movement, the locking pin 149, yieldingly supported at 151 in or upon the cam 146, is retracted from the notch 150 in the end of the actuating bar 110. Thus, when the lever 65 is moved, as shown in Figs. 17 and 18, to the position shown in Fig. 18 from that shown in Fig. 17, the bar 110 is released from locking engagement with the cam 146 and is cammed thereby into engagement with the opposite cam 146. The tapered or rounded end 147 of rod 110 engages and depresses the other yieldingly supported locking pin 149 and rides over the same until said end abuts the cut away portion 152 of the other cam 146 and seats the pin 149 in the slot 150, thereby locking said bar 110 to the other cam 146. The casing 153 surrounding each of said cams is provided with a slot 154 through which extends the lever 64 or 65 hereinbefore described.

The means for interlocking the bars 110, and if desired or necessary, the rods 135 when a plurality of units are used, is illustrated in Figs. 19, 20 and 21. The connecting means while illustrative of the connection between the rods 110 is equally applicable with minor modifications to connect the rods 135. The connecting plate 155 is provided with two projections 156 substantially similar to the pins 149 and engageable in the slots 150 of the adjacent ends of the rods 110. A suitable cover plate 157 is provided with depending sides 158 which substantially includes the bar 110 and the bottom plate 155. Said cover and side plates are secured to the bottom plate 155 by means of the bolt or screw and nut construction 159 and 160, thereby clamping the adjacent ends of the bars 110 to the connection, and, therefore, connecting the same.

The means for indicating the vote cast, the description of the office, and the candidate associated with each indicating mechanism is disclosed in Figs. 1, 10 and 22 to 28 inclusive. It will be remembered that each of the side plates 120, see Fig. 10, is provided with a plurality of grooves, the forward one being designated by the numeral 161 and the rearward one by the numeral 162. In Fig. 1 the numeral 59 generally indicates a grooved plate 163 slidable in and receivable by the grooves 161. Said plate is provided with inwardly turned flanges 164 see Figs. 25 and 27 and supports a transparent cover member 165. The plate 163 is perforated at 166 and a suitable indicating card 167 is similarly perforated at 168 and is also provided with suitable office and candidate designations, as well as other information. Thus, the plate 163 slidably supports both the transparent member and the information card. In the base of each plate 163 there is provided an opening 169 into which extends a pin member 170, whereby when said pin member is moved it is adapted to elevate or lower the plate 163. In the groove 162, there is slidably supported a perforated plate 171 provided with perforations 172 which register with the upper numerals upon the counting wheels 99. When the registering openings or apertures 166 and 168 are in registration with the aperture 172, as shown in Fig. 27, it will be apparent that the numerals upon the counting wheels 99 will be visible. Since it is desired that said numerals only be visible to the election officials, means is provided whereby said plate 163 will be elevated into the non-registering position and maintained in said position during the voting upon the machine. For this purpose a slot 173 see Figs. 25 and 27 is provided in each of the slidable perforated plates 171 and through said slot extends the pin 170. Said pin 170 has a threaded engagement with a rocking rod 174. In a plural paneled machine, each of the panels or units is provided with the rod 174. Said rods are suitably connected together such that manipulation of one rod or the rocking thereof will actuate the remaining rods and simultaneously elevate or depress the slidable plates 163. The plate 163 may be removed by unthreading the pin 170 from the bar 174. The rod 174 see Figs. 23 and 24 terminates adjacent and within the frame 50 and said frame is provided with an opening 175 through which a suitable key may be inserted for engagement with a complementary formed end 176 of the rod 174. Thus, said rod may be rocked from the position shown in Fig. 27, wherein the apertures register for the exposure of the numerals, to the position shown in Fig. 25, where said apertures are non-registrable and during the voting period are not exposed.

Means is provided for locking the machine against continued voting which will automatically lock the machine and prevent subsequent voting after the last voter has left the compartment or booth containing the machine. The mechanism is so arranged, however, that the last vote cast will be recorded if the person casting the vote is in the machine at the expiration of the voting period, and said machine is locked by the officials. The actuating rod or bar 110 see Figs. 23 and 24 is provided with a recess or slot 180, and positioned above said recess is a slidable bolt member 181 provided with a projecting finger portion 182. Said bolt is slidably supported upon the back of the plate 51 in a guide plate 183. Adjacent said bolt member is a pivotally supported latch 184 which is adjacent the transverse rod 174. It will be understood from Figs. 23 and 24 that the latch provided with the locking tooth 185 is engageable in a notch 186 in the bolt 181 and maintains said bolt in the elevated or nonlocking position when manually elevated. But when said pivoted latch is rocked upon its pivot, said tooth 185 is retracted from the notch 186 and permits the bolt 181 to drop and engage in the recess 180 upon the rod 110. If a voter is in the booth or compartment and voting, said bolt does not lock the rod 110 see Fig. 23. Upon the voter leaving the booth, the lever 65 actuates the rod 110 and moves the same from the right hand corner of the same to the left hand corner of the machine, thereby moving the vertical bars 111 to register the vote, and at its limit of movement, said bolt engages in the slot 180 and locks the transverse actuating bar 110 against further movement.

Since it is desired that the voters are not to see the number of votes cast for each candidate, it will be remembered that the rod 174 is maintained in such position that the pin bolts 170 are maintained in the elevated position. The rod 174 adjacent the pivotally supported latch 184 see Figs. 24, 26 and 28 yielding supports the pin 187 which is adapted to engage a projecting portion 188 on the pivoted catch 184 to remove said catch from the notch 186. Thus, when the rod 174 is rocked to depress the slides 163 to expose the numerals, said rocking movement automatically releases the bolt 181 and locks the rod 110 so as to prevent manipulation of the other mechanisms and fraudulent voting.

The means for indicating the number of votes cast and whether a voter is in the booth or compartment containing the voting machine is illustrated in detail in Figs. 29 and 30, said figures being rear views of the machine. The numeral 66 indicates the foregoing means in Fig. 1 and is herein used to indicate the casing thereof suitably secured to the framework 50 of the voting machine. The framework 50 is slotted to receive a sliding bar 190 which is connected to one of the vertical bars 111 by means of link bar 191. Thus, sideward movement of the vertical bars 111 is transmitted by the link bar 191 to the reciprocating rod or bar 190. The reciprocating rod or bar 190 extends into the housing 66 and the plate portion preferably integral therewith is provided with the letters in sequence as follows, " O, I, U, N, T." The casing 66 is provided with three spaced apertures or openings 192 through which two or three of said letters are visible in either position of the rod 190. Thus, the letters will indicate visually whether a voter is "in" the booth or compartment, or whether the voter is " out " of the booth or compartment. The bar 190 is also provided with a tongue 193 which is seatable in a recess 194 of an actuating bar 195 substantially similar to the mechanism hereinbefore described for registering the vote. Similar recording wheels, ratchet and counterweighted escapement 101, all as hereinbefore described, are preferably used for registering the total number of votes cast. Fig. 29 illustrates the position of the bar 111 and the recording mechanism associated therewith when a voter is in the machine and selecting the candidates for the offices, and Fig. 30 illustrates the position of said parts when the voter is leaving said machine after having selected his candidates and said selection is registered.

The means for voting upon questions, such as the initiative, referendum, recall, bond issues and the like is shown clearly in Figs. 2 and 3. Each of the pivotal cams associated with the indicating knob when the same pertains to a question is slightly different from the pivotal cam 71 shown in said figures. In the present invention two superposed indicating knobs are associated together, one knob being provided with the word " Yes " and the other knob being provided with the word " No " upon their faces. Since all of the knobs for voting upon questions such as indicated are substantially the same, a description of one pair of cooperating knobs for registering the affirmative and negative vote upon a single question will suffice for an understanding of them all. The normal position of the parts is illustrated in Fig. 2, and Fig. 3 illustrates one of said parts moved to the indicating position. In the present invention the usual transferring bar 79 is replaced by a substantially similar bar 196 (lower left portion of each figure), which is shortened at 197 so that the same will have no connection with the other transferring mechanisms upon the same line.

Each of the registering bars 89 is replaced by a substantially similar bar 198, but in this instance the curved or arcuate cam portion 199 is not notched as are the cam portions of the recording bar 89. It will also be understood that the pivotal Y or T-shaped lock designated by the numerals 105 and 108 is herein omitted. The cam 71 is also changed in outline. The upper cam is herein designated by the numeral 200, and the cooperating cam is designated by the numeral 201. Associated with each cam is the usual pin 70 carried by the indicating knob 53. The upper cam 200 is pivotally supported upon the pivot 72, and one portion thereof is provided with a curved or arcuate groove 202 substantially similar to the arcuate groove 77 of the cam 71. Said groove 202 receives the curved cam 199, as shown. The cam 200 is further provided with two extensions extending angularly thereof and of each other. One angular extension 203 is substantially similar to the depending extension 73 of the cam 71 and is engageable by the pin 70. The other angular extension is herein designated by the numeral 204, and the same is movable from the normal position into a depending position so as to engage with the cam 201 positioned therebeneath. The cam 201 is provided with a notch 205 in the upper arm thereof substantially similar to the notch 78 in the cam 71, and the depending extension 204 is engageable in said notch. The cam 201 is also provided with a depending portion 206 substantially similar to the depending portion 73 of the cam 71 engageable by the pin 70. Fig. 2 illustrates the normal or non-indicating position of said cams. Fig. 3 illustrates the upper cam after the same has been moved to the indicating position. It will be noted that the extension 204 is moved downwardly into engagement with the upper arm of the pivotal cam 201 and engages in the groove 205 thereof to lock said pivotal cam in the non-indicating position.

Should the voter desire to change his selection from the upper to the lower indicating means, actuation of the indicating means supporting the pin 70 adjacent the lower cam 201 will actuate the cam 201 and move the same from the position shown in Figs. 2 and 3 into a position substantially identical with the position of the depending arm 73 of the cam 71. Simultaneously with the movement of the cam 201, the upper arm thereof, engages the depending portion 204 and moves the same clockwise from the position shown in Fig. 3 to the position shown in Fig. 2. This in turn rocks the pivotal cam 200 positioned above the pivotal cam 201 from the position shown in Fig. 3 to the position shown in Fig. 2. In said movement, the depending arm 203 engages the pin 70 associated therewith and move the indicating mechanism back to the non-indicating position. Thus, it will be noted that the "Yes" or "No" or affirmative or negative voting upon any question will be interlocked, yet permit the voter to change his selection, in case a mistake was made in the first selection. It will also be understood that whichever bar 198 is actuated, said bar will engage the ratchet of the recording mechanism and record the vote when the voter leaves the voting compartment in substantially the same manner as hereinbefore described for the other recording of the votes.

In Figs. 31, 32 and 33, there is illustrated in addition to the locking construction associated with the transverse bar 110 suitable means for automatically restricting the vote of a restricted voter. Certain jurisdictions require that a vote upon certain bond issues by tax payers be given, and that the voters thereof pay taxes to a certain amount, other jurisdictions have local disability laws which do not affect State or national suffrage. Therefore, it is desirable to provide means for restricting the vote and yet permit the restricted voter to cast the restricted vote upon the machine. Said means is illustrated in the before mentioned figures, wherein Fig. 31 illustrates the normal or non-restricted position of the mechanisms. Fig. 32 illustrates the restricting mechanisms. Both of said figures illustrate the carrying bars associated with the indicating mechanisms hereinbefore described in the extreme or indicated positions. Fig. 33 illustrates the normal and non-indicating position of the transfer bars. The figures are rear elevational views, and in said figures 51, it will be remembered, is the stationary supporting plate upon which is slidably supported the transfer or carrier bars 79 provided with the abutting ends 86, said bars being shown by the dotted lines in said figures. The bars it will be remembered are provided with the pins 80 and 81, which extend through and are slidable in the slots 82 and 83 respectively formed in the plate 51. It will also be remembered that the vertical bars 111 are movable upwardly and sidewardly to move the carrier bars from the position shown in Fig. 31 to the original or non-indicating position shown in Fig. 33. Upon the forward face of the plate 51, there is slidably supported a restricting plate 207. The restricting plate bar 207 is provided with suitable notches 208 and 209. The notches 208 are enlarged and the notches 209 are smaller than the notches 208. The notches 209 are just large enough to receive the extending end 86 of the carrier bar 79 when said restricting bar 207 is in but one position; while the notches 208 are sufficiently large to receive the projecting portions 86 in any position of the restricting bar. Therefore, it will be noted that the carrier bars associated with the enlarged notches 208 permit the restricted voter to vote for said offices; while the carrier bars associated with the smaller notches 209 prevent the restricted voter from voting for the restricted offices.

The means for moving the restricting plate 207 is as follows: The plate 51 is provided with a plurality of vertically elongated slots 210 and the plate bar 207 is provided with a plurality of pins 211, which in the present instance comprise screw bolts 212 seatable in and extending through the slots 210. The means for reciprocating the slidable bar comprises a goose neck member 213 which has an elongated end slidably supported in a slot 214 in the bottom portion of the rectangular frame 50. The inwardly extending end of said goose neck is suitably secured to the plate, preferably by means of one of the screw bolts 212. The outwardly extending end of the goose neck extends angularly of the inwardly extending portion and is provided with an upwardly extending portion 215, which is bent to provide a finger portion 216. The upwardly and outwardly extending portion is slidably supported in a guide bracket 217.

It will be apparent, therefore, that when the election officials elevate the goose neck 213 from the position shown in Figs. 31 and 33 to the position shown in Fig. 32, the voter cannot move any of the restricted transfer or carrier bars 79 from the position shown in Fig. 33 to the position shown in Fig. 32, since the restricted carrier bars will abut against the unnotched portions of the plate bar 207; while the unrestricted carrier bars will be seatable in the enlarged notches 208 see Fig. 32. All of the carrier bars are in the registering or carrying position, and this represents the ordinary unrestricted voting position see Fig. 31. Fig. 33 represents the non-indicating position for the same unrestricted vote.

In order to maintain the restricting plate bar 207 in the restricted position during the entire interval that the restricted voter is registering his selection, and yet not require the election officials to maintain the goose neck 213 in the elevated position, suitable means is associated with said restricting plate bar, and preferably with the adjacent vertical clearing bar 111. A hook, plate or similar construction 218 is suitably supported upon one of the vertical bars 111 and is provided with an engaging pin portion 219. Pivotally supported upon the back of the plate 51 is another hook member 220 substantially U-shaped, which is pivoted at its upper end 221. The lower free end 222 is adapted to be associated with a pin 223 carried by the restricting plate bar 207, which pin extends through one of the slots 210, as shown. Figs. 31 and 32 illustrate the normal or non-registering positions of the clearing and registering vertical bar 111; while Fig. 33 represents the clearing position of said bar. The normal position of the free end 222 of the U-shaped hook member is shown in Fig. 31 wherein said end abuts the pin member 223. When the goose neck 213 is actuated to operate the restricting plate bar 207, said U-shaped hook passes beneath the pin 223 elevated by the gooseneck, and said hook positions itself beneath said pin and maintains said pin in the elevated position, and, therefore, said plate in the restricting position during the entire interval that the restricted voter is making his selection. Upon the restricted voter leaving the booth or compartment, the lever 65, it will be remembered, actuates the bar 110, which in turn actuates the bell crank 173 which moves the bar 111 upwardly and sidewardly, due to the link support 112 attached thereto. This sideward and upward movement is transmitted by means of the hook and pin 218 and 219 to the U-shaped hook 220 to withdraw the same from engagement with the elevated pin 223. Therefore, the restricted plate bar 207 is permitted to return to its original or non-restricting position.

The means for writing in a vote for each individual office, or for voting upon a ticket which has been made up subsequent to the making up of the official tickets, is illustrated in Figs. 34 to 38 inclusive. Reference will now be had thereto. The plate 60 of each unit suitably supports a similar number of individual knobs or keys, and said individual knobs or keys are herein designated by the numerals 224, each of which is provided with an extending plate portion 225. Positioned adjacent said individual knobs 224 may be a master knob 226 see Fig. 34 and if desired the main master controlling wheel may be associated with this ticket. Similarly, there is provided adjacent the plate 60 an indicating slide 59 substantially similar to the other indicating slides hereinbefore mentioned. If a ticket is inserted after the official ticket has been made up, the same may be readily inserted with reference to the slide 59 as previously illustrated in Figs. 25 and 27. Usually, however, the means 59 is left blank, and of course the master controlling wheel 226 while positioned upon the plate 60 is not provided with a controlling rack bar 124 or the like.

The plate 60 is provided with a plurality of openings 227, each of which is closed by the flap or plate portions 225 of one of the indicating fingers 224, see Fig. 34 which illustrates the mechanism associated with the writing in feature hereinbefore described. Each of the indicating knobs 224 is provided with the usual actuating pin 70, and in Fig. 34 one of said pins and one of said knobs are illustrated in the indicating position; while other of said knobs and other of said pins are illustrated in the non-indicating position. Associated with each of the pins 70 is a pivotal cam 71, the transfer bar or carrier bar 79, the counterweighted escapement 101, the registering bar 89, the pivotal lock 105 and ratchet 100. All of said parts are substantially similar or identical with the parts hereinbefore described. Pivotally supported upon the plate 51 and above each of the openings 227 in the plate 60 see Fig. 34 is a locking or latching member 229 provided with an extension 230 suitably notched at 231 in its free end. The notch 231 is adapted to engage the projecting end 85 of the carrier bar 79 and actuate said bar and lock the same in the actuated position, and, therefore, lock the other mechanisms for the same office in the non-indicating position. A vertical rod 232 is vertically reciprocable in much the same manner as the vertical rods 111 and by the same mechanism such as the transverse bar or rod 110.

The vertical rod 232 is provided with a plurality of forwardly extending projections or pins 233, which pins extend through suitable slots 234 in the plate 51, see Fig. 34. There is positioned beneath each pivoted bar or latch 229 one of said projecting pin portions 233 such that said latch may be moved from the locked position to the unlocked position, when the lever 65 is actuated by the voter leaving the booth or compartment. The locking bar or latch 229 normally rides upon the end 85 of the adjacent carrier bar 79. Thus, after the voter has moved the indicating knob 224 to uncover the aperture 227 to deposit the "written in" ballot, the remaining indicating mechanisms for the same office are locked through the carrier bars against further manipulation, so that the voter is unable to cast two votes for the same office.

Reference will now be had to Figs. 35 to 38 inclusive. It is intended that where a ballot is written in, said ballot is to be enclosed in a suitable capsule 235, which capsule is to be of predetermined dimensions so that the same is receivable by the slot 227. The plate 51 is also provided with a slot 236 for each slot 227, and said slots are connected by suitable guide means 237. Suitably secured to the plate 51 is a pair of side members 238 positioned upon opposite sides of the slots 237, and the channel formed therebetween is closed by a slotted plate 239. The slotted plate 239 is provided with a plurality of slots 240. The plate 239 is slidable with respect to the supporting guide plates 241 and the position of the plate 239 with respect to the plates 60 and 51 is such that each opening 227 is adapted to receive but one capsule 235. Said construction is illustrated clearly in Fig. 37. The plate 239 is normally positioned so that the slot 240 does not register with the capsule compartments formed by the guide plates 241, and the slots 227 and 236 in the plates 60 and 51 respectively until such time as the voter leaves the booth or compartment. The rod 110 is provided with a projection or lug 242 which is adapted to engage the tapered end 243 of a vertically reciprocable member 244 slidable in the guide means 245. The end 246 is secured to the plate 239 for reciprocating the same in timed relation with the lever 65 or closure means associated therewith. When the cam or lug 242 engages the lower end of the slidable member 244 and lifts the same as shown in Fig. 38, the plate 239 is likewise elevated thereby until the slots 240 register with the compartments, so that the capsule 235 is permitted to be discharged from the compartments hereinbefore described. Simultaneously therewith, it will be remembered, see Fig. 34, that the rod 232 is actuated to return the latch 229 to its original position, and the bars 111 are actuated to return the indicating mechanisms, and, therefore, the cover plates 225 to their original position, thereby preventing further voting until the next voter enters the machine. Fig. 36 illustrates a plurality of ducts 247, each of which is adapted to register with a discharging aperture or opening 240 so as to receive the written in ballot contained within the capsule 235. Each duct discharges into a suitable container and the ballots are collected therein so as to be counted at the conclusion of the voting period by the election officials.

The voting machine is provided with suitable means which is adjustable for selection of a number of votes for like offices. In some jurisdictions the electors having choice of candidates may select a plurality of candidates for a plurality of offices. It is herein admitted that but three like offices are to be filled, but it will be readily understood that the same mechanism with but slight changes may be enlarged to provide for a selection of candidates for a larger number of like offices. Herein the means is illustrated in Figs. 37 to 42 inclusive as providing for a selection of three like offices, and shows the adjustability thereof of one, two or three like offices. In Fig. 39, the limiting means is shown dotted and the actuating means is shown in full lines. In said figure the upper train of mechanisms is identical with the usual upper and lower train of mechanisms hereinbefore described, and is also illustrated in Figs. 2, 3 and 34. The three intermediate trains of mechanisms are associated together with the limiting means hereinbefore indicated. The two upper trains of the three intermediate trains of mechanisms are illustrated in the normal or non-indicating position; while the lower train illustrates one of the indicating mechanisms in the indicating position.

Associated with each of the indicating mechanisms hereinbefore described, each of which indicates a candidate for one of a plurality of like offices, there is the usual actuating pin. In the present instance each of the usual pivotal cams 71 is replaced by a pivotal cam 250. The shape of this cam is slightly different from that of the cam 71, and the lower arm of this cam is substantially similar to the lower arm 75 of the cam 71. The upper arm of this cam, however, is provided with a projecting portion 251 and an adjacent projection 252. The cam is also provided with the usual actuating depending projection 253 substantially similar to the depending projection 73 of the cam 71. In the present instance the pivotal lock 105 is replaced by another pivotal member 254 provided with a forwardly extending portion 255 and normally seatable in the groove between the projections 251 and 252, thereby permitting a plurality of pivotal cams in the same train to be actuated successively but preventing simultaneous operation thereof by the portion 255 engaging the adjacent carrier bar. Each of the carrier bars 256 in this modification is substantially similar to the carrier bars 79, excepting that the end 257 thereof is different from the end 86 of the carrier bar 79. The end 257 carries a pin 258 and said pin is associated with suitable registering mechanisms for indicating each time the cam 250 has been actuated. Thus, movement of each cam is registered by the limiting mechanism. It will be remembered that each of the recording bars 89 is adapted to actuate the ratchet 100 only when the adjacent and connected pivotal cam 250 is moved to the indicating position. Thus, the particular vote is registered and the number of votes therefor is limited, since each time one of the cams 250 is operated, the bar 256 by means of the projecting portion 251 of the cam 250 reciprocates either the carrier bar 256 directly or by means of another carrier bar 79 in abuttable relation therewith. It will be understood, of course, that after each selection the carrier bars instantly are returned to the original position, as indicated in Fig. 39 by means to be described hereinafter and has no effect upon the actuating or registering bar 89, since the same is provided with the usual cam 199 which is seatable in the curved recess 77 of the non-actuated cam 250.

The means for recording and restricting the number of votes cast for like offices and for returning the transfer carrier bars 79 and 256 to their original positions is illustrated clearly in Figs. 40 to 42 inclusive. Positioned upon the back of the plate 51 and adjacent a vertically and sidewardly movable clearance bar 111 is the restricting mechanism. Said mechanism comprises a plate 260 suitably secured to the plate 51 and upon the rear side thereof. It will be remembered that the pins 258 extend through slots 261 in the plate 51 and are reciprocable in said slots. The plate 260 is provided with a plurality of notches 262 adjacent each of the slots 261 such that the pin 258 is movable in said slot and into said notch. Pivotally supported upon the plate 60 adjacent each slot and each notch is an actuating and returning cam 263. Said cam is provided with a projecting portion 264 and an engaging portion 265, said engaging portion bearing against the projecting portion of the pin 258.

Suitably supported upon the plate 51 is a housing 266 and slidably supported within said housing is a plunger 267. Within said housing and associated with said plunger is suitable yielding means, such as the coil spring 268. The plunger 267 upon its lower end carries a cross bar 269, and secured to said cross bar at one end thereof is a depending bar 270 provided with outwardly projecting lugs 271. Each of the lugs 271 is positioned adjacent one of the projecting portions 264 of the pivotally supported cams 263 so that when the adjacent pin 258 is moved from the position shown in Fig. 40 to the position indicated by the lowermost pin in Fig. 41, said cam elevates said plunger in opposition to the spring 268. Said plunger through suitable means registers the selection of one candidate for one of the plurality of like offices. Upon the release of the indicating mechanisms, the spring 268 forces the lugs 271 to bear upon the projecting portions 264 of the cam 263 and forces the pin 258 from the position shown in Fig. 41 to the position shown in Fig. 42, thereby returning the transfer or carrier bars 256 and 79 to their original or non-indicating position. Suitable stop means, such as the pin 272, is associated with the plunger 267 and limits the extent of downward movement thereof. It will thus be noted that any one of the pins 258 is adapted to elevate the plunger and cross bar 269 whenever any one of the pins 70 associated with the actuating cams 250 is moved to the indicating position.

Pivotally supported at 273 upon the plates 260 is a hook receiving member 274 having the tooth 275. Pivotally supported upon the cross head 269 is another hook member 276 provided with a cam surface 276ª and a hook 277. It will be remembered that the cross head 269 is movable by means of the pins 258, and in the upward movement of said cross head the hook 276, which is pivotally supported on said cross head, is movable upwardly therewith. Slidably supported in a guide slot 278 is a serrated plate 279 provided with a plurality of teeth, such as the teeth 280 upon one face thereof and the teeth 281 upon the other face thereof. The teeth 280 are adapted to be engaged by the hook 277; while the teeth 281 are adapted to be engaged by the tooth 275. Thus, the upward movement of the cross bar or cross head 269 carries with it the pivotally supported hook 276 and the serrated plate 279. Since the hook 274 is pivotally supported on the stationary plate, the tooth portion 275 rides over one tooth 281 and engages in the second tooth to maintain the plate 279 in the elevated position. Fig. 40 illustrates the initial position of said cooperating hooks and the serrated plate; while Fig. 41 illustrates the position assumed by said parts after one selection has been made. Upon the return movement of the cross head, due to the spring 268, the pivoted hook 276 rides over one of these teeth 280 and engages the next succeeding tooth. This operation is continued until the number of teeth provided is exhausted. Since there is considerable tension in the spring 268, said spring will maintain the pins 258 in the position shown in Fig. 40 and 42, and thus prevent further selection of candidates for the same office after the limited number has been made.

The means for releasing the limiting means hereinbefore described comprises a lever member 282 rigidly secured at 282ᵃ to one of the vertically and sidewardly movable rods 111. It will be remembered that the rods or bars 111 are movable by the bar or rod 110, and this in turn is actuated by the lever 65 or equivalent or associated means. The cam arm 282 is provided with a cam surface 283 and a cam pin 284. The pivoted hook 274 is provided with a pin 285. In the upward and sideward movement of the rod 111, the cam arm 282 moves upwardly and sidewardly therewith. In this upward and sideward movement, the cam surface 283 engages the pin 285 upon the pivoted lever 274 and withdraws the tooth 275 from the teeth 281 of the serrated cam plate 279. Simultaneously therewith the cam pin 284 carried by said cam arm engages the cam surface 276ᵃ of the pivoted hook 276 and moves the same sidewardly to withdraw the tooth 277 from the teeth 280 of the serrated plate 279, thereby releasing the plate 279 from engagement with both of said hooks. This allows the serrated plate to return to its initial or starting position, as shown in Fig. 40. The open or releasing positions of the two hooks and the actuation thereof by means of the cam arm is clearly illustrated in Fig. 42.

Since but three selections are herein illustrated, it will be understood that more teeth may be provided when more selections are to be made. When a plurality of selections are to be made, a suitable plate 286 is rigidly secured by means of the screws 287 to the plate 260. Said plate 286 is provided with a notch 288 upon which the serrated plate 277 is adapted to rest when in the zero or initial position. Said plate 286 is also adjustably supported upon plate 260 by means of the slot 289 in which is seatable one of the pins 287. Said plate 260 is also provided with a plurality of threaded openings 298 in which the other of said screw bolts 287 is secured, one opening being provided for each selection. Adjacent each of the openings 298 is a numeral 299 which indicates the number of selections possible. When the plate 286 is adjustably secured upon the plate 260, the plate 286 is provided with an opening 300 through which one of said numerals 299 is visible. Thus, in Fig. 40 it will be noted that Fig. 3 is visible through the opening 300, and, therefore designates that but three selections for candidates for like offices are possible.

The means for clearing the machine when an error has been made without recording the erroneous selections and for restoring the machine to its original non-indicating position comprises an error button or knob 350, see Figs. 1, 22 and particularly 44. The button or knob is provided with an eccentric pin 351, and supported upon said pin is a slidable bar 352. Said bar 352 in turn is provided with an opening in which is seatable a pin 353, which pin is carried by a plate member 354. Plate 354 and bar 352 move as a unit. The plate is suitably notched at 355 to receive the elongated projections 86 of the adjacent transfer or carrier bars 79 or equivalent bars. The intermediate portions of the notched bar 354 are cut away at 356 to form a seat 357 which abuts and engages the lower end 108 of a pivoted Y or T-shaped locking cam. The other end 105 of said cam engages the abutment 106 of the carrier bar 79 in the same manner as hereinbefore described. Thus, rotation of the error wheel or knob 350 will elevate the bar 352 and in turn elevate the plate 354, and, therefore, tilt all the cams upon their pivots and thus return all of the carrier bars 79 to their original or non-indicating position, motion being transmitted through the abutting ends 85 and 86 of said carrier bars. The indicating mechanisms for the pivotal cams 71 are simultaneously returned with the pins 70 and the indicating buttons 53 by means of the abutment 84 engaging the upper end 76 of said pivotal cam 71. When a plurality of panels are used, means similar to that hereinbefore described for coupling the master party controlling knob to control the several units or panels is used to connect the error operated master wheel or knob see bottom of Figs. 1 and 22.

In Figs. 45 and 46 there is illustrated one form of means for registering at a headquarters the total number of votes cast simultaneously with the casting of the vote. At suitable headquarters distant from the precincts, stations or voting booths, there is provided a panel 360, which panel includes a plurality of the usual counting mechanisms herein designated generally by the numerals 361. In the present instance the numerals on these mechanisms are exposed and suitable legend means may be used to designate the ward, precinct or other voting territory, and also the total number of registered voters therein. Thus, at any instant the proportion of the vote cast to the total number of voters in said voting jurisdictions can be ascertained. The means for operating each of the recording mechanisms in timed relation and simultaneously with the casting of each vote upon the particular voting machine includes suitable means such as an electric circuit. In the housing or casing 66 of the totalling device hereinbefore described, there are provided two terminals 362 and 363, the heads 364 of which are adapted to be short-circuited by means of a plate 365 suitably supported upon a pivoted lever 366 and insulated therefrom. A suitable spring member 367 maintains said switch member or lever in the elevated position, and, therefore, in the open circuit position. The lever 366 is provided with a projection 368 positioned beneath the pivotally supported counterweighted escapement 369. Thus, when a vote is registered in the casing 66, as hereinbefore described with reference to Figs. 29 and 30, said escapement will depress the lever 366 and close the circuit through the contacts 362 and 363. Suitable circuit means are connected with the terminals 362 and 363 see Fig. 45 and are adapted to energize an electromagnet 370 see Fig. 46, which magnet is provided with an armature core 371 and an armature plate 372. A carrier bar 373 is slidably supported upon a suitable back plate 374 positioned in the rear of the plate 360, and associated therewith is a tension spring 375. The pin 376 upon the carrier bar 373 is seated in a yoke-shaped pivoted member 377 carrying the armature 372. The carrier bar 373 is provided with the usual depending tongue 87 seatable in the slot 88 of the usual actuating bar 89. Thus, when a voter is leaving the booth or compartment containing the machine, operation of the departure lever 65, reciprocating the rod 199, therefore, registers a vote in the casing 66. Simultaneously therewith the escapement 369 is actuated to depress the switch element 365 and close the circuit including the electro-magnet 370. Closure of said circuit energizes said magnet and draws the pivoted yoke-shaped member 377 carrying the armature 372 towards said magnet, and, therefore, slides the bar 373 and the actuating bar 89 from the position shown in Fig. 46 to the right thereof. Simultaneously therewith, said indicating mechanism is rotated to register the casting of one vote. The spring means 375 returns the carrier bar 373 and the actuating bar 89 to their original positions. In this manner, all of the votes cast may be recorded. A main master switch, not shown, may control all of the electro-magnets 370, since said magnets may be connected in multiple and energized from a single source of electrical energy. Therefore, it will be understood at the expiration of the voting period, such a master switch can be actuated to disconnect all the electromagnets, and, therefore, a positive check can be made on all the votes legally cast during the voting period.

In Figs. 47 and 48 curtain means associated with the machine is disclosed. It will be understood that any suitable wall may be used for one portion of the compartment, the machine or frame 50 forming the other portion thereof, and, therefore, but two bars are necessary to completely enclose the voter while making his or her selection. In the present invention provision is made for adding units to the machine, and yet permit the usual curtains to be used therewith. Upon the side of the rectangular frame 50 there is provided a tubular housing 380. Suitably secured thereto and slidably supported in said housing is a rod or tube 381. A collar 382 is adjustably positioned upon said rod by suitable means, such as a set screw 383, therefore, determining the height of said rod which carries with it a lateral portion 384 and a depending portion 385. The outer end of the rod 64 supports a tubular member 386 which is adapted to slidably or telescopically receive the depending end 385, as shown. There is provided upon the end 385 a similar collar 387 suitably secured thereto by means of the set screw 388. Thus, the frame of the curtain may be enlarged to accommodate any size of machine associated therewith. A suitable T member 389 supports a transverse rod or tube 390. A similar T member 389 upon a similar vertical post or rod 381 associated with the lever 65 supports a tubular member 391, which tubular member is telescopically arranged with reference to the tube or rod 390, therefore, permitting the curtain framework to be extended along the machine when units are added laterally thereto.

Reference will now be had to Figs. 1 and 44, wherein the restricting mechanism is illustrated which is adaptable for use in primary elections. It will be noted that in primary elections the voter necessarily must declare the party, the candidates for which he intends to vote. The voting machine illustrated in Fig. 1 shows two panels which are connected together, but which may be detached if desired. In primary elections, the candidates of a party may be associated with a unit. When this type of election is held, the various connecting rods, such as 135 and others which have been hereinbefore mentioned, are disconnected and the various master controls are also disconnected by omitting the several buttons or wheels. However, it will be remembered that each of the panels or units in the voting machine has been provided with a vertically extending locking bar 354, which bar is shown in detail in Fig. 44. This bar, it will be remembered, is the main error bar and is adapted to actuate the locking cams or levers 105—108 to lock the mechanisms against voting, or to return the mechanisms to their original positions. In the present instance said bar serves to lock the mechanisms in the voting position when the bar 354 is maintained in its elevated position. Suitably secured to the bar 354 is a rod 413 substantially similar to the actuating rod 213 shown in Fig. 31. This rod extends through an aperture 414 in the casing of the voting machine. The gooseneck portion 415 provided with an outwardly extending handle portion 416 is slidably supported in the guide or bracket 417. By the aforesaid means, the restricting plate or bar 354 may be elevated by the election official. Each unit, it is to be understood, is provided with such a means for elevating the bar 354 of each unit. Thus when but two parties are voting in a primary, the election official operates the gooseneck elevator 415 of the party for which the voter has not declared himself, thereby locking the undeclared party candidate selections against registration. Maintaining and releasing mechanism of the type shown in Figs. 31 may be provided if desired.

The plate 354 is provided with a latch 420 pivotally supported at 421 upon the plate or bar 354. Said latch 420 is provided with an angularly extending hook 422, which is so adapted to be associated with a stationarily mounted pin 423. It will be understood that when the plate 354 is elevated by means of the gooseneck 415, the lever 420 is elevated therewith, and said angular portion 422 rides up and seats itself upon a pin 423, thereby maintaining the plate 354 in the elevated and locking position. This is somewhat like the mechanism shown in Fig. 31.

The means for automatically unlocking said locking mechanism comprises a plate or strip 418 carried by one of the movable actuating bars 111. Thus, the strip 418 carries a pin 419 which is adapted to engage the lever 420 and move the same outwardly to permit the plate 354 to return by gravity to its original or non-locking position. It will also be remembered that the bar 111 is only actuated when the voter leaves the voting booth by means of the lever 65 being moved by the voter opening the door of the booth or compartment. Thus, the restricting and locking mechanism is automatically returned to its original position.

The means for indicating the declaration of the voter is shown in Fig. 1. A suitable signaling device which may be in the form of a legend plate, or which may be in the form of a lamp, or which may be in the form of a bell, is mounted upon each of the unit panels, and is lettered or provided with legends to represent the other panels. Thus, if the left hand panel in Fig. 1 is used for Republican candidates in the primary election, and the right hand panel is used for Democratic candidates, the indicating device 400 will be labeled "Democratic", thereby indicating that the Republican Party selections have been locked, and that the voter is only permitted to vote upon the Democratic panel, or the right hand panel, as illustrated in Fig. 1. This indicating device, as stated, may be of any suitable type, that herein shown being a slidable plate 400 which may be directly connected to the bar 354 and slidable therewith, or may be otherwise operated thereby. It will also be noted that the device will be returned to its original non-indicating position within the casing, or behind the same when the plate 354 is returned by the voter leaving the compartment.

The invention claimed is:

1. A voting machine including a register, a sliding actuating bar normally out of position to actuate the register and having a notch therein and having a projection near one end provided with a notch therein, a voting pivot cam with two arms, a carrier bar engageable by one of said arms and movable thereby, and a tongue on said carrier bar seatable in said first mentioned notch for moving said actuating bar, the other arm engaging said notched projection so that said other arm after said lever has been returned will lift the actuating bar in its return movement so as not to actuate said register.

2. A voting machine including a plurality of registers, a sliding actuating bar for each register normally out of position to actuate the register and having a notch therein and having a projection near one end provided with a notch therein, a voting pivot cam for each register with two arms, one arm being adapted to move said actuating bar when said pivot cam is operated into indicating position, a carrier bar for each of said registers and engageable by the pivot cam of the same register and movable thereby, a tongue on said carrier bar seatable in said first mentioned notch for moving the actuating bar of said register, said other arm of each pivot cam while said cam is being returned engaging the notched projection to lift in its return movement the actuating bar and return the same without actuating the register, and means operated by one of the pivotal cams for returning a previously operated pivotal cam and thus positioning the actuating bar associated with said previously operated pivotal cam in the non-indicating position with respect to its register and positioning the actuating bar of the last mentioned operated pivotal cam in the indicating register operable position.

3. A voting machine including a series of registers, a sliding actuating bar for each register which is normally out of registering position, and has a notch therein and a projection near one end also provided with a notch, a voting pivotal cam having two arms, a carrier bar adjacent said actuating bar and engageable by one of said arms of the pivotal cam engaging the carrier bar and movable thereby, a tongue on said carrier bar seatable in said first mentioned notch for moving said actuating bar, the other arm engaging said notched projection, so that said other arm when the cam is being returned will lift the actuating bar in its return movement without actuating the register, said carrier bars abutting against each other, and a pivotal locking member in position to be actuated by a pivotal cam of the adjacent carrier bar for returning either the former or the latter to its non-indicating position.

4. A voting machine including a series of registers, a sliding actuating bar for each register which is normally out of registering position and has a notch therein and a projection near one end also provided with a notch, a voting pivotal cam for each register having two arms, a carrier bar adjacent said actuating bar and engageable by one of said arms of the pivotal cam and movable thereby, a tongue on said carrier bar seatable in said first mentioned notch for moving said actuating bar, the other arm engaging said notched projection, so that said other arm when the cam is being returned will lift the actuating bar in its return movement without actuating the register, said carrier bars abutting against each other, a pivotal locking member in position to be actuated by a pivotal cam of the adjacent carrier bar for returning either the former or the latter to its non-indicating position, and a single means for returning all of said carrier and actuating bars and pivotal cams to their original positions without actuating the registers.

5. A voting machine including a plurality of series of superposed mechanisms, each series including a plurality of registers, a sliding actuating bar for each register normally out of the register actuating position, a pivotal voting cam for moving said register actuating bar into the register actuating position, a carrier bar also movable by said pivotal voting cam into position, said actuating bar and said carrier bar being associated together, means associating the pivotal cam with the adjacent carrier bar, whereby when one of said cams is operated, the subsequent operation of another cam will return the aforesaid mechanisms to their original positions except the last mentioned associated mechanisms, and a common means for returning all of the mechanisms in each superposed series to the non-indicating position without actuating any of the registers thereof.

6. In a voting machine, the combination of means for limiting the number of votes cast for the same office, and a plurality of indicating mechanisms and registers for each candidate for the said office, said mechanisms being arranged in a series, each comprising a register actuating bar and carrier bar adjacent thereto, the carrier bars of adjacent indicating mechanisms abutting each other, whereby operation of any one of said carrier bars will actuate the adjacent and succeeding carrier bars in series to register in said vote limiting mechanism, pivotal cam means for actuating said register actuating bar and said carrier bar adjacent thereto, said pivotal cam having a projection thereon and a notch adjacent thereto, said notch and projection forming a ledge, a pivotal locking member adjacent said ledge and the adjacent carrier bar and normally seatable on said ledge to permit movement of said carrier bar but preventing movement thereof when actuated by the adjacent pivotal cam, and permitting movement of said carrier bar after said pivotal cam has been moved to its operative position, thereby preventing simultaneous operation of a plurality of pivotal cams, but permitting successive operation thereof.

7. A voting machine including a pair of voting knobs arranged in superposed relation, each having an actuating pin portion, a pair of superposed pivotally supported cam members, each having a portion engageable by one of said pins, a register adjacent each of said pivotal cams, an actuating bar associated with each of said pivotal cams and the adjacent register and movable by said cam into actuating position, said bar and said cam being so associated that when said cam is returned to its initial position, said actuating bar is likewise returned to its position without actuating the register, a depending projection upon the uppermost cam, and an upstanding projection on the lowermost cam, said last mentioned projection having a groove therein, whereby said cams are not related so that when either of said knobs is actuated, the other knob and mechanism will be moved to the inoperative position, yet permit the other knob to be actuated to return the first mentioned knob and mechanisms to the inoperative position and the last mentioned mechanism to the operative position.

8. In a voting machine, a plurality of superposed series of mechanisms, each series of mechanisms including a plurality of registers, a sliding actuating bar for each register which is normally out of registering position and has a notch therein and a projection near one end, a voting pivotal cam for each register, said cam having two arms, a carrier bar adjacent said actuating bar and engageable by one of said arms of the pivotal cam and movable thereby, a tongue on said carrier bar seatable in said notch for moving said actuating bar, the other arm engaging said projection, so that said other arm when the cam is being returned will lift the actuating bar in its return movement without actuating the register, said carrier bars abutting against each other, a pivotal member positioned adjacent the end carrier bar of each superposed series, and a single member for simultaneously tilting said pivotal members to actuate said carrier bars to return all of the operated mechanisms to the indicating position without actuating the registers thereof.

9. In a voting machine, a plurality of superposed series of mechanisms, each series of mechanisms including a plurality of registers, a sliding actuating bar for each register which is normally out of registering position and has a notch therein and a projection near one end a voting pivotal cam for each register, said cams having two arms, a carrier bar adjacent said actuating bar and engageable by one of said arms of the pivotal cam and movable thereby, a tongue on said carrier bar seatable in said notch for moving said actuating bar, the other arm engaging said projection, so that said other arm when the cam is being returned will lift the actuating bar in its return movement without actuating the register, said carrier bars abutting against each other, a pivotal locking member in position to be actuated by a pivotal cam of the adjacent carrier bar for returning either the former or the latter to its non-actuating position, a pivotal member positioned adjacent the end carrier bar of each superposed series, and a single member for simultaneously tilting said pivotal members to actuate said carrier bars to return all of the operated mechanisms to the indicating position without actuating the registers thereof.

10. In a voting machine, a plurality of mechanisms arranged in series and superposed relation, each series of mechanisms including a plurality of registers, a sliding actuating bar for each register which is normally out of registering position having a notch therein and a projection near one end, a pivotal cam having two arms, a carrier bar adjacent said actuating bar and engageable by one of said arms of the pivotal cam and movable thereby, a tongue on said carrier bar seatable in said notch for moving said actuating bar, the other arm engaging said projection, so that said other arm when the cam is being returned will lift the actuating bar in its return movement without actuating the register, said carrier bars abutting against each other, a pivotal member positioned adjacent the end carrier bar of each superposed series, a notched bar suitably cut away both transversely and longitudinally to receive the free ends of the end carrier bar to permit movement of said end carrier bars without affecting the last mentioned bar, projecting portions on said notched bar for simultaneously tilting the pivotal members for returning all of the carrier bars and mechanisms associated therewith to the non-indicating position without actuating the registers, and eccentric means operable from the face of the voting machine for reciprocating said notched bar to return all of the indicating mechanisms to the non-indicating position.

11. In a voting machine, the combination of a plurality of registers, an actuating bar for each register, a pivotal cam for each actuating bar having a pair of projections, a carrier bar for each actuating bar, one of said projections being associated with one of said carrier bars for actuating the same, said carrier bars being in abuttable relation, a pivotal locking member associated with one of said pivotal cam members and the next adjacent carrier bar, and a pivotal locking member positioned adjacent the last mentioned carrier bar, whereby when the pivotal cam adjacent the last mentioned pivotal locking member is moved to the indicating position, said actuating bar adjacent thereto and the carrier bar associated therewith will be simultaneously moved to the actuating position and will simultaneously move the first mentioned pivotal locking member into locking position to lock the other pivotal cam and its registering mechanism in the non-indicating position, said second mentioned pivotal locking member engaging the adjacent carrier bar for locking the same and preventing the return thereof.

12. In a voting machine, the combination of a plurality of registers, an actuating bar for each register, a pivotal cam for each actuating bar having a pair of projections, a carrier bar for each actuating bar, one of said projections being associated with one of said carrier bars for actuating the same, said carrier bars being in abuttable relation, a pivotal locking member associated with one of said pivotal cam members and the next adjacent carrier bar, a pivotal locking member positioned adjacent the last mentioned carrier bar, whereby when the pivotal cam adjacent the last mentioned pivotal locking member is moved to the indicating position, said actuating bar adjacent thereto and the carrier bar associated therewith will be simultaneously moved to the actuating position and will simultaneously move the first mentioned pivotal locking member into locking position to lock the other pivotal cam and its registering mechanism in the non-indicating position said second mentioned pivotal locking member engaging the adjacent carrier bar for locking the same and preventing the return thereof, and means for tilting the second mentioned pivotal locking member into unlocking position.

13. In a voting machine, the combination of a plurality of registers arranged in horizontal and vertical tiers, each horizontal tier being associated with the same office, an actuating bar for each register, a pivotal cam for each actuating bar having a pair of projections, a carrier bar for each actuating bar, one of said projections being associated with one of said carrier bars for actuating the same, said carrier bars being in abuttable relation, a pivotal locking member associated with one of said pivotal cam members and the next adjacent carrier bar, a pivotal locking member positioned adjacent the last mentioned carrier bar, whereby when the pivotal cam adjacent the last mentioned pivotal locking member is moved to the indicating position, said actuating bar adjacent thereto and the carrier bar associated therewith will be simultaneously moved to the actuating position and will simultaneously move the first mentioned pivotal locking member into locking position to lock the other pivotal cam and its registering mechanism in the non-indicating position, said second mentioned pivotal locking member engaging the adjacent carrier bar for locking the same and preventing the return thereof, and a single means for simultaneously tilting all of the second mentioned pivotal locking members to permit the reeturn of all the carrier bars and the pivotal cams.

14. In a voting machine, the combination of a plate having a plurality of slots therein, an indicating knob adjacent each of said slots and having a projection for covering the same, a plurality of compartments, each communicating with a slot and each adapted to receive a single ballot, a single sliding plate having a plurality of apertures therein, each aperture being adapted to register with an adjacent slot to permit the removal of the ballots in the compartments, said plate normally maintaining said apertures out of registration with said slots and movable into registering position simultaneously with the return of said indicating knobs to cover said slots.

15. In a voting machine, the combination of a plurality of registers, an actuating bar for each register, a pivotal cam for each actuating bar having a pair of projections, a carrier bar for each actuating bar, one of said projections being associated with one of said carrier bars for actuating the same, said carrier bars being in abuttable relation, a pivotal locking member associated with one of said pivotal cam members and the next adjacent carrier bar, a pivotal locking member positioned adjacent the last mentioned carrier bar, whereby when the pivotal cam adjacent the last mentioned pivotal locking member is moved to the indicating position, said actuating bar adjacent thereto and the carrier bar associated therewith will be simultaneously moved to the actuating position and will simultaneously move the first mentioned pivotal locking member into locking position to lock the other pivotal cam and its registering mechanism in the non-indicating position, said second mentioned pivotal locking member engaging the adjacent carrier bar for locking the same and preventing the return thereof, a plate having a slot therein, a compartment communicating with said slot and adapted to receive a ballot, an actuating knob having a projection normally covering said slot when in the non-indicating position and movable into the indicating position to uncover said slot and actuate said last mentioned pivotal cam, and means for preventing the insertion of more than one ballot into said compartment.

16. In a voting machine, the combination of a plurality of registers, an actuating bar for each register, a pivotal cam for each actuating bar having a pair of projections, a carrier bar for each actuating bar, one of said projections being associated with one of said carrier bars for actuating the same, said carrier bars being in abuttable relation, a pivotal locking member associated with one of said pivotal cam members and the next adjacent carrier bar, a pivotal locking member positioned adjacent the last mentioned carrier bar, whereby when the pivotal cam adjacent the last mentioned pivotal locking member is moved to the indicating position, said actuating bar adjacent thereto and the carrier bar associated therewith will be simultaneously moved to the actuating position and will simultaneously move the first mentioned pivotal locking member into locking position to lock the other pivotal cam and its registering mechanism in the non-indicating position, said second mentioned pivotal locking member engaging the adjacent carrier bar for locking the same and preventing the return thereof, a compartment having a mouth and adapted to receive a ballot, an actuating knob having a projection normally covering said mouth when in the non-indicating position and movable into the indicating position to uncover said mouth and actuate said last mentioned pivotal cam, means for preventing the insertion of more than one ballot into said compartment, and means for tilting the second mentioned pivotal locking member into unlocking position simultaneously with the actuation of said compartment limiting means to permit the discharge of the ballot and the return of the indicating knob to its original non-indicating and mouth-closing position.

17. In a voting machine, the combination of a plurality of series of registers, an actuating bar for each register, a pivotal cam for each actuating bar having a pair of projections, a carrier bar for each actuating bar, one of said projections being associated with one of said carrier bars for actuating the same, said carrier bars being in abuttable relation, a pivotal locking member associated with one of the pivotal cam members and the next adjacent carrier bar, a pivotal locking member positioned adjacent the last mentioned carrier bar, whereby when the pivotal cam adjacent the last mentioned pivotal locking member is moved to the indicating position, said actuating bar adjacent thereto and the carrier bar associated therewith will be simultaneously moved to the actuating position and will simultaneously move the first mentioned locking member into locking position to lock the other pivotal cam and its registering mechanism in the non-indicating position, said second mentioned locking member engaging the adjacent carrier bar for locking the same and preventing the return thereof, a plate having a plurality of slots therein, an indicating knob adjacent each of said slots and having a projection for covering the same, a plurality of compartments, each communicating with a slot and each adapted to receive a single ballot, means associated with the compartments for preventing the insertion of more than one ballot into each compartment and movable into a position to release the ballots from the compartments simultaneously with the return of the indicating knobs to their original positions to cover their respective slots, means for tilting said second mentioned pivotal locking members into unlocking position simultaneously with the return of the indicating knobs to their original position, a single means associated with said compartments, and a single means for tilting said second mentioned pivotal locking members into unlocking position simultaneously with the return of the indicating knobs to their original position.

18. In a voting machine, the combination of a plurality of series of registers, an actuating bar for each register, a pivotal cam for each actuating bar having a pair of projections, a carrier bar for each actuating bar, one of said projections being associated with one of said carrier bars for actuating the same, said carrier bars being in abuttable relation, a pivotal locking member associated with one of the pivotal cam members of each series and the next adjacent carrier bar, a second pivotal locking member positioned adjacent the last mentioned carrier bar of each series, whereby when the pivotal cam adjacent the last mentioned pivotal locking member is moved to the indicating position, said actuating bar adjacent thereto and the carrier bar associated therewith will be simultaneously moved to the actuating position and will simultaneously move the first mentioned locking member into locking position to lock the other pivotal cam and its registering mechanism in the non-indicating position, said second mentioned locking member engaging the adjacent carrier bar for locking the same and preventing the return thereof, a plate having a plurality of slots therein, an indicating knob adjacent each of said slots and having a projection for covering the same, a plurality of compartments, each communicating with a slot and each adapted to receive a single ballot, means associated with the compartments for preventing the insertion of more than one ballot into each compartment and movable into a position to release the ballots from the compartments simultaneously with the return of the indicating knobs of their original positions to cover their respective slots, means for tilting said second mentioned pivotal locking members into unlocking position simultaneously with the return of the indicating knobs to their original position, and a common means for simultaneously actuating the compartment ballot limiting means and the second-mentioned locking lever tilting means.

19. In a voting machine, the combination of vote registering mechanisms, means associated with said vote registering mechanisms for registering the selection, a reciprocating member provided with indicating legends and a depending tongue and actuatable by said first mentioned means for indicating whether the voting machine is occupied, or unoccupied, and a registering mechanism including an actuating bar having a notch therein adapted to receive said tongue for simultaneously registering upon said last mentioned registering mechanism the casting of a vote when said reciprocating member is moved to indicate the unoccupied position of the voting machine.

20. In a voting machine, the combination of a plurality of vote registering mechanisms, a sliding actuating bar for actuating said mechanisms to return the same to their non-indicating positions and simultaneously register the vote cast, said bar having a recess in each end, a plurality of cam means for reciprocating said bar, each cam having a projection adapted to engage in said recess and lock the bar in position, and means for actuating each of said cam means.

21. In a voting machine, the combination of a plurality of vote registering mechanisms, a plurality of sliding actuating bars for actuating said mechanisms to return the same to their non-indicating position and simultaneously register the vote cast, said bar having a recess in each end, a plurality of cam means for reciprocating said bar, each cam having a projection adapted to engage in said recess and lock the bar in position, means for actuating each of said cam means, said plurality of actuating bars being in alignment with each other, and means for connecting said bars together to operate as a unit, said means including a base plate provided with projections seatable in the recesses of adjacent ends of two adjacent bars, and means for securing said base plate to said bars.

22. In a voting machine, the combination of a plurality of voting registering mechanisms, an indicating knob for each of said mechanisms, including an actuating pin portion, a bar provided with a plurality of elongated notches, each pin portion being seatable in one of said elongated notches, whereby movement of the bar will simultaneously move each pin portion to actuate the indicating mechanism, yet permit individual actuation of each indicating knob, master moving means for moving the notched bar, another auxiliary master bar similarly notched and associated with a portion of said plurality of pin means, said second mentioned bar being movable by said first mentioned bar, and vice versa, and auxiliary master moving means associated with said auxiliary master moving bar, whereby the indicating mechanisms associated therewith may be simultaneously returned to the non-indicating position with the master moving bar without returning the remainder of the master bar actuated pins and associated means to the non-indicating position.

23. In a voting machine, the combination of a plurality of vote registering mechanisms, an indicating knob for each of said mechanisms, including an actuating pin portion, a bar provided with a plurality of elongated notches, each pin portion being seatable in one of said elongated notches, whereby movement of the bar will simultaneously move each pin portion to actuate the indicating mechanism, yet permit individual actuation of each indicating knob when said bar is in the non-indicating position, master moving means for moving the notched bar, another auxiliary master bar similarly notched and associated with a portion of said plurality of pin means, said bar being movable by said first mentioned bar, and vice versa, another auxiliary actuating bar similar to the first mentioned auxiliary actuating bar and similarly associated with the main actuating bar and with a plurality of other pin means, and auxiliary master moving means associated with each of the auxiliary master moving bars, whereby the indicating mechanisms associated therewith may be simultaneously returned to the non-indicating position with the master moving bar without returning the remainder of the master bar actuated pins and associated means to the non-indicating position.

24. In a voting machine, the combination of a plurality of vote indicating and registering mechanisms arranged in tiers and including a plurality thereof in series in each tier, said mechanisms representing dissimilar candidates for the same party and dissimilar offices, each mechanism including an actuating pin, the mechanisms for the same office being interconnected so that movement of one mechanism will lock the remaining mechanisms for the same office to prevent plural voting, yet permit said selection to be changed and another mechanism operated, a master actuating bar having a plurality of elongated notches, said bar being adapted to be associated with all of the pins of the indicating mechanisms of the candidates of the same party for simultaneously moving said mechanisms into the indicating position yet permit the return of any of said indicating mechanisms to the non-indicating position upon the movement of another indicating mechanism to the indicating position, and an auxiliary master controlling bar similarly notched and associated with a plurality of the indicating mechanisms of each party to permit the simultaneous selection of candidates in another party and the remainder of the candidates in the first mentioned party.

25. In a voting machine, the combination of a plurality of vote indicating and registering mechanisms arranged in tiers and including a plurality thereof in series in each tier, said mechanisms representing dissimilar candidates for the same party and dissimilar offices, each mechanism including an actuating pin, the mechanisms for the same office being interconnected so that movement of one mechanism will lock the remaining mechanisms for the same office to prevent plural voting, yet permit said selection to be changed and another mechanism operated, a master actuating bar having a plurality of elongated notches, said bar being adapted to be associated with all of the pins of the indicating mechanisms of the candidates of the same party for simultaneously moving said mechanisms into the indicating position yet permit the return of any of said indicating mechanisms to the non-indicating position upon the movement of another indicating mechanism in another party to the indicating position, an auxiliary master controlling bar similarly notched and associated with a plurality of the indicating mechanisms of each party to permit the simultaneous selection of candidates in another party and the remainder of the candidates in the first mentioned party, and another auxiliary actuating bar associated with other indicating mechanisms not associated with the other auxiliary actuating bar and similarly operable with and by the main actuating bar of each party to permit simultaneous group-voting substantially as described.

26. In a voting machine, the combination of a plurality of indicating mechanisms, each including an actuating pin, said mechanisms being in aligned relation, a bar positioned adjacent said pins and having elongated notches in which said pins are seatable, said pins being movable into indicating position by said bar, yet when in non-indicating position permitting the independent movement of each of said indicating mechanisms, a pivotally supported lever adjacent said bar, means on said lever for reciprocating said bar, and means on the voting machine for tilting said lever to reciprocate said bar.

27. In a plural panel voting machine, the combination of a plurality of aligned indicating mechanisms in each panel, each mechanism including an actuating pin portion, a notched bar operatively associated with each of the pin portions of the aligned indicating mechanisms in each panel, lever means for reciprocating each of the bars, and a single means for simultaneously tilting all of said lever means.

28. In a voting machine, a registering mechanism for each candidate for an office, a series of transfer bars, each associated with one of said registering mechanisms, said bars being in alignment with each other for the same office and movable for registering a vote for the office, a plate slidably supported transversely of said series of bars and provided with elongated and narrow slots, said elongated slots permitting the movement of said transfer bars independent of the position of said sliding plate, and said narrow slots preventing movement of said transfer bars when said plate is out of registering position with said bars, pivotal catch means upon said voting machine for maintaining said plate in the vote-preventing position, means for returning said transfer bars to their original position and simultaneously releasing said plate from said catch, and means controlled by the election official for operating the sliding plate.

29. In a voting machine, a ballot holder for each party ticket slidably mounted in said machine and suitably perforated, a plurality of registering mechanisms positioned in the rear of said ballot holder and adapted to be exposed through said perforation when said ballot holder is in registering relation therewith, an indicating mechanism for each registering mechanism, means for moving said ballot holder into and out of registering position and operable by the election official, means for registering each voter's selection and returning the indicating mechanisms to their original positions, said last mentioned means having a slot therein, a bolt receivable by said slot and normally maintained in retracted position, and means operable by the ballot holder moving means for releasing said bolt from its retracted position to permit said bolt to enter said recess when said returning means registers said recess with said bolt.

30. In a voting machine, a ballot holder for each party ticket slidably mounted in said machine and suitably perforated, a plurality of registering mechanisms positioned in the rear of said ballot holder and adapted to be exposed through said perforation when said ballot holder is in registering relation therewith, means for moving said ballot holder into and out of registering position and operable by the election official, an indicating mechanism for each registering mechanism, means for registering each voter's selection and returning the indicating mechanisms to their original positions, said last mentioned means having a slot therein, a bolt receivable by said slot, and normally maintained in retracted position, means operable by the ballot holder moving means for releasing said bolt from its retracted position to permit said bolt to enter said recess when said returning means registers said recess with said bolt, and means for retracting said bolt from said recess.

31. In a voting machine, a ballot holder for each party ticket slidably mounted in said machine and suitably perforated, a plurality of registering mechanisms positioned in the rear of said ballot holder and adapted to be exposed through said perforations when said ballot holder is in registering relation therewith, means for moving said ballot holder into and out of registering position and operable by the election official, an indicating mechanism for each registering mechanism, means for registering each voter's selection and returning the indicating mechanisms to their original positions, said last mentioned means having a slot therein, a bolt receivable by said slot, and normally maintained in retracted position, means operable by the ballot holder moving means for releasing said bolt from its retracted position to permit said bolt to enter said recess when said returning means registers said recess with said bolt, and means for preventing transverse movement of the bolt, thereby preventing voting of the entire machine while said registering mechanisms are exposed through the perforated ballot holders.

32. In a voting machine, the combination of a registering mechanism including a toothed wheel, pawl means for rotating said toothed wheel, means operable by the voting machine in the casting of a vote for actuating said pawl means, lever means actuatable by said pawl means, and switch means actuatable by said lever means.

33. A voting machine including a plurality of unit panels suitably connected together, means providing entry and egress to and from said voting machine, adjustable means associated with said voting machine and said last mentioned means for suitably enclosing said voting machine.

34. In a voting machine, the combination of a plurality of primary tickets and voting mechanisms therefor, means for locking the primary mechanisms in the non-voting position, means for maintaining said locking means in locked relation during the voting operation, and means for automatically releasing said locking means from locking engagement upon the casting of a vote.

35. In a voting machine, the combination of a plurality of primary tickets having voting mechanisms therefor, means for locking the mechanisms of all but one of said parties, and means for indicating the declared party.

36. In a voting machine, the combination of a plurality of primary tickets having voting mechanisms therefor, means for locking the mechanisms of all but one of said parties, and means for indicating the declared party, said party indicating means and said locking means being simultaneously returnable to the non-indicating and non-locking positions.

37. In a voting machine, the combination of a plurality of primary tickets having voting mechanisms therefor, means for locking the mechanisms of all but one of said parties, means for indicating the declared party, and means for simultaneously returning the party indicating means to the non-indicating position, and the locking means to the non-locking position, and registering the vote.

In witness whereof, I have hereunto affixed my signature.

WILLIAM J. SCHUESSLER.